United States Patent
Greenwald et al.

(10) Patent No.: US 10,395,234 B1
(45) Date of Patent: Aug. 27, 2019

(54) MOBILE DEVICE ENABLEMENT OF UNIVERSAL PREPAID CARDS

(71) Applicant: Cray Pay Inc., Mesa, AZ (US)

(72) Inventors: Marshall Greenwald, Mesa, AZ (US); Jared McClure, Mesa, AZ (US); Michael Greenwald, Mesa, AZ (US)

(73) Assignee: Cray Pay Inc., Mesa, AZ (US)

( * ) Notice: Subject to any disclaimer, the term of this patent is extended or adjusted under 35 U.S.C. 154(b) by 285 days.

(21) Appl. No.: 15/457,083

(22) Filed: Mar. 13, 2017

Related U.S. Application Data

(60) Provisional application No. 62/308,491, filed on Mar. 15, 2016.

(51) Int. Cl.
| | |
|---|---|
| *G06Q 30/00* | (2012.01) |
| *G06Q 20/32* | (2012.01) |
| *G06K 19/06* | (2006.01) |
| *G06K 7/14* | (2006.01) |
| *G06Q 20/34* | (2012.01) |
| *G06Q 30/02* | (2012.01) |

(52) U.S. Cl.
CPC ....... *G06Q 20/3224* (2013.01); *G06K 7/1413* (2013.01); *G06K 19/06028* (2013.01); *G06Q 20/342* (2013.01); *G06Q 30/0238* (2013.01)

(58) Field of Classification Search
CPC .......... G06Q 20/3224; G06Q 30/0238; G06Q 20/342; G06K 19/06028; G06K 7/1413
See application file for complete search history.

(56) References Cited

U.S. PATENT DOCUMENTS

| | | |
|---|---|---|
| 8,036,944 B2 | 10/2011 | Lee et al. |
| 8,301,495 B2 | 10/2012 | Mason |
| 8,725,589 B1 * | 5/2014 | Skelding ............. G06Q 20/341 705/26.5 |

(Continued)

FOREIGN PATENT DOCUMENTS

WO    2012/162568    11/2012

OTHER PUBLICATIONS

Exxon Mobile Corporation, "Mobile Payment with Speedpass+," http://www.exxon.com/speedpassplus, retrieved Nov. 20, 2015, 6 pages.

(Continued)

*Primary Examiner* — Luis A Brown
(74) *Attorney, Agent, or Firm* — McDonnell Boehnen Hulbert & Berghoff LLP

(57) ABSTRACT

An example embodiment may involve receiving a representation of a location of the mobile device as provided by way of location-determining hardware of the mobile device; transmitting, to the mobile device, representations of one or more merchants with physical presence within a radius of the location; receiving, from the mobile device, representations of a gift card request, a first amount, and a merchant, where the merchant was selected from the one or more merchants; transmitting, to the mobile device, a digital gift card branded by the merchant, where the digital gift card is associated with a code; receiving, from a point-of-sale device associated with the merchant, a request to validate the code, where the code was obtained by the point-of-sale device scanning the code as displayed by the mobile device; and transmitting, to the point-of-sale device, validation of the code.

17 Claims, 17 Drawing Sheets

(56) References Cited

U.S. PATENT DOCUMENTS

| | | | |
|---|---|---|---|
| 8,924,246 B1* | 12/2014 | Chen | G06Q 20/023 705/26.82 |
| 9,015,066 B2* | 4/2015 | Scipioni | G06Q 20/3672 705/21 |
| 9,117,242 B1* | 8/2015 | Ellis | G06Q 40/00 |
| 9,160,729 B2 | 10/2015 | Lyman et al. | |
| 2009/0171804 A1 | 7/2009 | Lee et al. | |
| 2011/0231344 A1 | 9/2011 | Hall | |
| 2011/0295705 A1* | 12/2011 | Kasmei | G06Q 20/105 705/16 |
| 2012/0066043 A1* | 3/2012 | Carmichael | G06Q 20/0457 705/14.23 |
| 2012/0088523 A1* | 4/2012 | Shirakawa | G06Q 10/10 455/456.3 |
| 2012/0203572 A1 | 8/2012 | Christensen | |
| 2012/0203697 A1* | 8/2012 | Morgan | H04W 12/06 705/44 |
| 2012/0253902 A1* | 10/2012 | Carney, II | G06Q 30/02 705/14.12 |
| 2013/0024360 A1* | 1/2013 | Bailout | G06Q 20/04 705/39 |
| 2013/0041768 A1* | 2/2013 | Llach | G06Q 20/28 705/17 |
| 2013/0138563 A1* | 5/2013 | Gilder | G06Q 20/4016 705/44 |
| 2013/0151401 A1* | 6/2013 | Scipioni | G06Q 20/348 705/39 |
| 2013/0253832 A1* | 9/2013 | Nallu | G06Q 30/0633 701/537 |
| 2013/0304642 A1* | 11/2013 | Campos | G06Q 20/36 705/41 |
| 2014/0052607 A1* | 2/2014 | Park | G06Q 40/025 705/38 |
| 2014/0058902 A1* | 2/2014 | Taylor | G06Q 30/0635 705/26.81 |
| 2014/0067671 A1 | 3/2014 | DeHaven et al. | |
| 2014/0136349 A1* | 5/2014 | Dave | G06Q 20/20 705/16 |
| 2014/0143089 A1* | 5/2014 | Campos | G06Q 20/36 705/26.8 |
| 2014/0195425 A1 | 7/2014 | Campos et al. | |
| 2014/0207569 A1* | 7/2014 | Lam | G06Q 20/28 705/14.51 |
| 2014/0207598 A1* | 7/2014 | Lam | G06Q 20/18 705/23 |
| 2014/0214567 A1* | 7/2014 | Llach | G06Q 20/354 705/17 |
| 2014/0214663 A1* | 7/2014 | Wolfe | G06Q 30/06 705/41 |
| 2014/0236823 A1 | 8/2014 | Lee | |
| 2014/0358770 A1* | 12/2014 | Coyne | C06Q 20/342 705/39 |
| 2015/0017616 A1* | 1/2015 | Rachitsky | G09B 7/00 434/130 |
| 2015/0081533 A1 | 3/2015 | Gupta et al. | |
| 2015/0220118 A1* | 8/2015 | Kwak | G06F 1/1652 345/667 |
| 2015/0220119 A1* | 8/2015 | Seo | G06F 3/041 345/173 |
| 2015/0227913 A1* | 8/2015 | Bailout | G06Q 20/3223 705/42 |
| 2015/0287021 A1* | 10/2015 | Itwaru | G06Q 20/3276 705/44 |
| 2015/0348006 A1 | 12/2015 | Taveau et al. | |
| 2015/0371225 A1 | 12/2015 | Zhao | |
| 2016/0036799 A1 | 2/2016 | Lyman et al. | |
| 2016/0086249 A1 | 3/2016 | Zamer | |
| 2016/0335608 A1* | 11/2016 | Balasubramani | G06Q 20/322 |
| 2016/0350741 A1* | 12/2016 | Reen | G06Q 20/202 |
| 2016/0371668 A1* | 12/2016 | Priebatsch | G06Q 20/204 |
| 2017/0237736 A1* | 8/2017 | Eber | H04L 63/10 726/4 |

OTHER PUBLICATIONS

Google, Inc., "Android Pay—Android Apps on Google Pay," http://play.google.com/store/apps/details?id=com.google.android.apps.w . . . , retrieved Nov. 20, 2015, 4 pages.

Starbucks, "Starbucks app for iPhone—Now Serving Great Features," http://www.starbucks.com/coffeehouse/mobile-apps/mystarbucks, retrieved Nov. 20, 2015, 2 pages.

* cited by examiner

MOBILE DEVICE ENABLEMENT OF UNIVERSAL PREPAID CARDS

CROSS-REFERENCE TO RELATED APPLICATION

This application is a continuation of and claims priority to U.S. patent application No. 62/308,491, filed Mar. 15, 2016, which is hereby incorporated by reference in its entirety.

BACKGROUND

Mobile payment systems typically include regulated payment services performed from or by way of a mobile device. Instead of paying with cash, check, or credit cards, a consumer can use a mobile device (e.g., a smartphone) to pay for services, as well as physical and digital goods. Nonetheless, current mobile payment systems cannot be used at both point-of-sale (POS) terminals and online without requiring merchants or consumers to purchase new devices or other hardware. Furthermore, current systems do not support offering customized discounts and incentives to consumers so that the consumers spend with particular merchants in a manner that creates a long-term relationship between the consumer and merchant.

SUMMARY

The embodiments herein overcome these challenges, providing access to mobile payments for today's merchants and consumers. These embodiments involve a mobile payment application (app), compatible with any mobile device platform (e.g., IOS®, ANDROID®, or WINDOWS®), that can work at hundreds of thousands of merchant locations, providing instant savings and rewards on every purchase. The solution is designed to better understand consumer spending habits and preferences, while reinforcing and rewarding desired customer behavior. It also establishes a network of merchants that provides for the specific needs of its participants.

One of the major advantages over existing mobile payment solutions is the proprietary platform, which removes the requirement of costly hardware and software integration, thereby lowering the merchant barrier to entry. On the back end, the host system performs payment card industry (PCI) compliant payment services, consumer reward hosting, database storage, behavior tracking and merchant based programs.

The embodiments herein capitalize on the popularity and familiarity of gift cards, which provide the vehicle for incentives in its mobile payment model. The app markets merchants to the consumer by offering instant cash rewards of up to 40% off for gift card purchases of any variable amount, thus competing outside the realm of the traditional gift card market, and choosing to focus instead on the substantially larger transactional volume from day to day purchases. To consumers, the app provides the means to save instantly on routine or daily transactions. For merchants, it is an extremely enticing performance-based marketing platform.

This is the only app that offers instant savings of up to 40% to consumers on the entire purchase amount, with zero requirements for merchants to discount the retail price of products and services. It combines the deep discounts of daily deal sites such as GROUPON® that drive consumer traffic and spending, with the stored value of gift cards to maintain retail value for the merchant. This creates a winning and sustainable long-term relationship for consumers and merchants.

The payment system uses the existing credit card infrastructure. Users enter credit or debit card details in order to pay for future purchases. The system uses tokenization for payment security and does not require connection to a checking account, as seen with some controversial competitors. Consumers save on everything sold by participating merchants in the app provider's network. Unlike many sites or apps that offer discounts on a select range of products or services, users save on 100% of the products or services sold by merchants. Additionally, users can use coupons, specials, ads, etc. with all purchases to save even more.

Consumers are continually rewarded. Through back end automation and geolocation, the app customizes the consumer experience with targeted incentives and rewards based on user behavior, demographics, and the needs of the merchant network. Upon meeting volume and frequency thresholds, incremental incentives are added to user profiles, offering greater loyalty rewards on all future purchases.

There are three types of merchants within the app provider's network. Brand Merchants are highly recognizable brands made available through a third party partner, allowing the app provider to participate in a revenue share for gift card purchases. A portion of the revenue share is retained by the app provider and the remaining share is passed on as a savings to the consumer. This relationship allows consumers to realize savings while shopping at Brand Merchants. Examples of merchants who might fall into this category are TARGET®, AMAZON®, BEST BUY®, AMC THEATERS®, THE HOME DEPOT®, and CVS PHARMACY®. The list of Brand Merchants can be modified from time to time as new Brand Merchants become available and as pricing allows.

Network Merchants are typically local businesses. These merchants agree to accept a Universal Prepaid Card (UPC) as payment for all transactions. They also agree to a non-cash marketing fee calculated from the retail price of the transaction, against the total value of the UPC. The extension of the UPC to a Network Merchant creates a non-cash liability to the app provider. The UPC can be spent by a merchant at full face value with any other Network Merchant or participating Revenue Share Merchant, exchanged for Brand Merchant gift cards at a reduced rate, or sold back to the app provider for cash at fifty percent of face value.

Revenue Sharing Merchants represent the third faction. Participation is similar to that of Brand Merchants, but at a local level. The app provider negotiates a traditional revenue share for merchant gift card sales to consumers at a minimum of 30% and also permits merchants to participate in the network by accepting the UPC as payment from other merchants. The pool of merchants comprising this category provides the app provider the ability to quickly onboard business-to-consumer (B2C) merchants and capture revenue from consumer purchases without over-saturating the Merchant Network with UPC funds, thus preserving value and spending options in the network. Revenue Sharing Merchants can also be converted to Network Merchants at the app provider's discretion, further providing controls for network stability.

The app provider generates revenue from consumer purchases and collects it to a general liability account. Each time merchants transact using a UPC in the network, the app provider assesses a non-cash marketing and transaction fee as a percentage of the entire purchase amount. An incremental gross margin is realized by the app provider as the UPC liability owed is adjusted to reflect the marketing and transactional fees assessed to the merchant. The model provides a win/win/win solution for merchants, consumers and the app provider. It is sustainable, scalable, highly automated to control labor costs, and provides sizable margins.

As noted above, the embodiments herein involve a mobile payment app compatible with any mobile device, that works at tens of thousands of merchant locations, and that provides savings and rewards to consumers on every purchase. The app provider may operate a network for local business owners that drives consumer spending. Merchants agree to supply the products or services, and the app provider generates consumer interest by advertising the merchant's availability through the mobile application.

The model does not limit rewards to specific offers nor does it provide a cap for services. Rather, it provides the consumer the ability to acquire a gift card for each merchant, available for all goods and services, at up to 40% off the retail price. Using the app, and by way of geo-location, consumers are able to search for neighboring businesses and receive instant reward savings when making purchases.

After patronizing the location, when a bill or invoice is presented, the consumer uses the app to enter and purchase a custom gift card for the total retail bill, while simultaneously receiving an instant reward saving on the purchase. The use of a gift card with stored value permits a realized discount to the consumer while maintaining full retail value to the merchant. The gift card is immediately exchanged for a merchant gift card of the same face value, which is the total amount due, and thereby provided as payment in full to the merchant.

These features allow the app provider to operate as an outsourced marketing arm of the merchant, enticing consumers to visit the merchant's stores. In return, the app provider takes a portion of the revenue from each transaction that consumers conduct with merchants.

Accordingly, a first example embodiment may involve receiving, by a computing system and from a mobile device, a representation of a location of the mobile device as provided by way of global positioning system (GPS) hardware of the mobile device. The first example embodiment may also involve transmitting, by the computing system and to the mobile device, representations of one or more merchants with physical presence within a given radius of the location. The first example embodiment may also involve receiving, by the computing system and from the mobile device, representations of a gift card request, a first amount, and a merchant, where the merchant was selected from the one or more merchants by way of a user interface of the mobile device. The first example embodiment may also involve debiting, by the computing system, an account associated with the mobile device by a second amount, where the second amount is less than the first amount. The first example embodiment may also involve transmitting, by the computing system and to the mobile device, a digital gift card branded by the merchant, where the digital gift card is for the first amount and is associated with a code. The first example embodiment may also involve receiving, by the computing system and from a point-of-sale device associated with the merchant, a request to validate the code, where the code was obtained by the point-of-sale device scanning the code as displayed by the mobile device. The first example embodiment may also involve transmitting, by the computing system and to the point-of-sale device, validation of the code.

A second example embodiment may involve transmitting, by an application operating on a mobile device and to a computing system, a representation of a location of the mobile device as provided by way of GPS hardware of the mobile device. The second example embodiment may also involve receiving and displaying on a user interface, by the application, representations of one or more merchants with physical presence within a given radius of the location. The second example embodiment may also involve receiving, by the application, selection of a merchant and a first amount, where the merchant was selected from the one or more merchants by way of the user interface. The second example embodiment may also involve transmitting, by the application and to the computing system, a representation of a gift card request, the merchant, and the first amount. The second example embodiment may also involve receiving, by the application and from the computing system, a digital gift card branded by the merchant, where the digital gift card is for the first amount and is associated with a code. The second example embodiment may also involve displaying, by the application, the code for scanning by a point-of-sale device of the merchant. The second example embodiment may also involve receiving, by the application and from the computing system, an indication that the merchant has been paid, where transmission of the indication was caused by the computing system receiving a representation of the code as scanned by the point-of-sale device.

A third example embodiment may involve receiving, by a computing system and from a mobile device, a representation of a location of the mobile device as provided by way of GPS hardware of the mobile device. The third example embodiment may also involve transmitting, by the computing system and to the mobile device, representations of one or more merchants with physical presence within a given radius of the location. The third example embodiment may also involve receiving, by the computing system and from the mobile device, representations of a gift card request, a first amount, and a merchant, where the merchant was selected from the one or more merchants by way of a user interface of the mobile device. The third example embodiment may also involve debiting, by the computing system, an account associated with the mobile device by a second amount, where the second amount is less than the first amount. The third example embodiment may also involve transmitting, by the computing system and to the mobile device, a digital gift card branded by the merchant, where the digital gift card is for the first amount and is associated with a code. The third example embodiment may also involve receiving, by the computing system and from the mobile device, an instruction to pay the merchant from the digital gift card. The third example embodiment may also involve transmitting, by the computing system and to a point-of-sale device associated with the merchant, validation that the merchant was paid a third amount, where the third amount is less than the first amount.

In a fourth example embodiment, an article of manufacture may include a non-transitory computer-readable medium, having stored thereon program instructions that, upon execution by a computing system, cause the computing system to perform operations in accordance with the first, second and/or third example embodiments.

In a fifth example embodiment, a computing system may include at least one processor, as well as memory and program instructions. The program instructions may be stored in the memory, and upon execution by the at least one processor, cause the computing system to perform operations in accordance with the first, second and/or third example embodiments.

In a sixth example embodiment, a system may include various means for carrying out each of the operations of the first, second and/or third example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
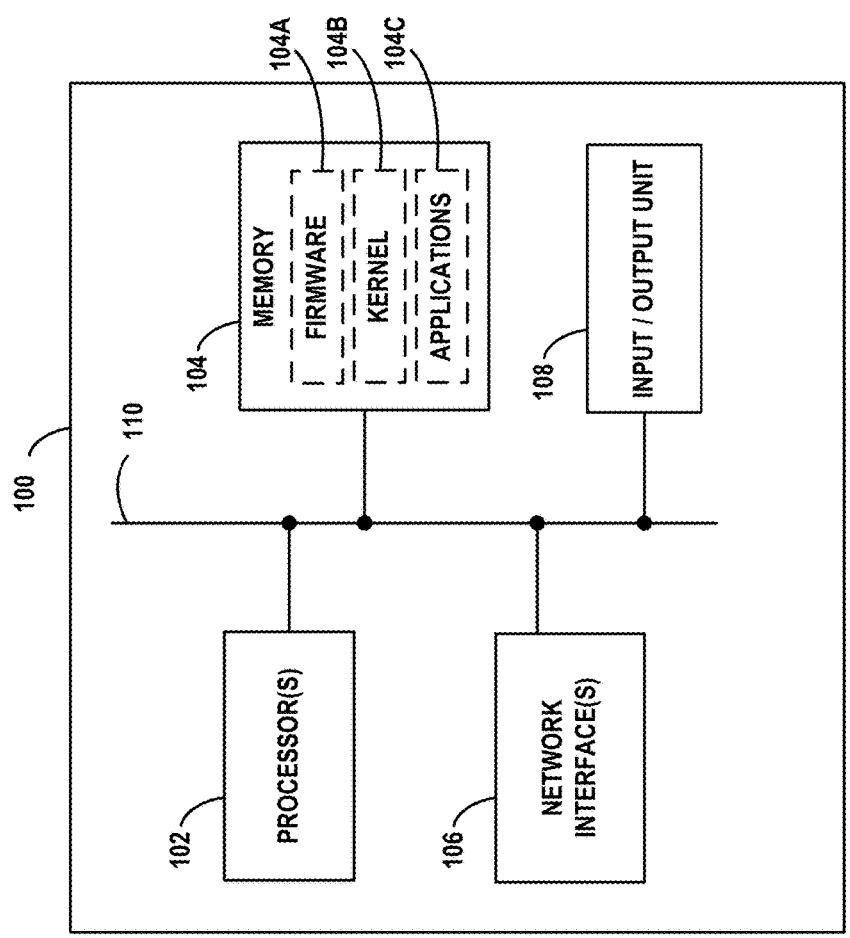
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

Consumers who currently make mobile payments may be likely to pay by mobile device more often if they were offered instant coupons from retailers when buying by mobile device, and rewarded points that are stored on their mobile device for future purchases. Mobile payments allow merchants to provide real-time incentives and targeted offers. Although still in its early days, the integration of digital wallets with value-added services is appearing in mobile apps. In some examples, popular rewards programs are offered by way of app. For instance, one third of a particular retailer's North American sales are funded by the company's prepaid cards, and the retailer's pre-funded QR-code based mobile app processes 10% of those transactions.

Despite the availability of the technology and the benefits associated with a consumer shift to mobile payments, mobile wallets have failed to gain traction in the marketplace due to the many hurdles that have not yet been overcome for consumer and merchant adoption. Most notably, there has not been a champion to partner with merchants and consumers in developing the next generation of mobile payments. There are three particular challenges to be overcome before widespread adoption of this next generation takes place.

First, consumer demand for mobile payments is not sufficient for merchants to rationalize the expense of new equipment for mobile payment processing. Near field communication (NFC) terminals widely required by existing mobile solutions are not used in traditional card swipe transactions. Integration of NFC technology is costly and merchants have been reluctant to incur those costs. Second, financial institutions and credit card associations are almost universally accepted by merchants. Multiple approaches by hardware manufacturers and software developers to develop new payment systems have bred more options, not fewer, resulting in merchant hesitancy to transition. Third, a change in consumer behavior commonly requires incentive.

Possible value propositions to consumers include monetary savings, improved security, ease of use, and financial incentive. Of all the potential benefits, financial incentives typically have the greatest potential in driving consumer adoption of mobile payments, but some are not feasible with the margins of existing payment models.

Current mobile payment systems rely heavily on hardware based solutions, requiring costly integration for merchants. Some existing solutions are dependent upon consumers having purchased the most recent phone models in order to pair with merchant terminals. This forces the majority of the potential customer base to purchase new devices in order to participate, which could take years for complete market turnover. Some mobile devices are already equipped with NFC hardware, but NFC terminals are still required in order to complete consumer payments, leaving the burden on merchants to upgrade before accepting payment.

Perhaps the most egregious oversight by mobile payment solution providers is the lack of incentive to either consumer or merchant. Current providers are aware of the lack of incentive to transition consumers to mobile payments, but the existing models rely on taking a margin from card issuers via interchange fees. With these margins growing smaller, it's highly unlikely that companies will make any significant profits to move the needle. While mobile device hardware manufacturers have the resources to provide these incentives, it appears that this is not their strategy. Instead, they seek lock consumers into their hardware and force merchants to acquiesce to hardware upgrades as the demand becomes one of significant importance to merchant sale volumes.

Gift cards are another form of payment that has developed in recent years for both POS payment and online transactions. However, the average consumer will only purchase approximately $200 of gift cards each year. The total size of the U.S. gift card market has grown from $19 billion in 1999 to $124 billion in 2014, and is projected to grow to $149 billion by the end of 2017.

Roughly two billion dollars' worth of gift cards went unredeemed in 2012. Over the past decade companies have sprung up as resellers of these unused cards. Some of these companies provide electronic delivery of discounted cards, as well as facilitate purchasing discounted gift cards at the POS.

Card resellers employ hundreds of personnel to manually verify the balances of their third party gift cards upon receipt and also just prior to resale. This manual verification process results in high labor costs and a lack of scalability. Also, the selling of third party cards carries an element of risk for the buyer.

Daily deals and flash deals sites do not typically engender long lasting and sustainable relationships with the merchant. While the sites benefit from a large revenue share upon consumer purchase, merchants are typically left waiting several weeks for very little retail revenue while juggling the costs to service customers. Daily deal sites usually pitch their service as a means to build a merchant's customer base with promises that the customers will return and pay full price. In reality, consumers are more commonly loyal to the deals offered by the site, and rarely return to the merchant, opting instead to move on to the next deal. Within the model, daily deal site always wins while the merchant almost always loses.

Given the limitations and drawbacks of today's mobile payment systems, it would be advantageous to provide a mobile payment system that incentivizes consumers and provides rapid purchase credit to merchants. The following embodiments describe architectural and functional aspects of example computing systems that may be used to support such a system.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed. The exact physical location, connectivity, and configuration of these computing devices may be unknown and/or unimportant to client devices. Accordingly, the computing devices may be referred to as "cloud-based" devices that may be housed at various remote data center locations.

Figure 2:
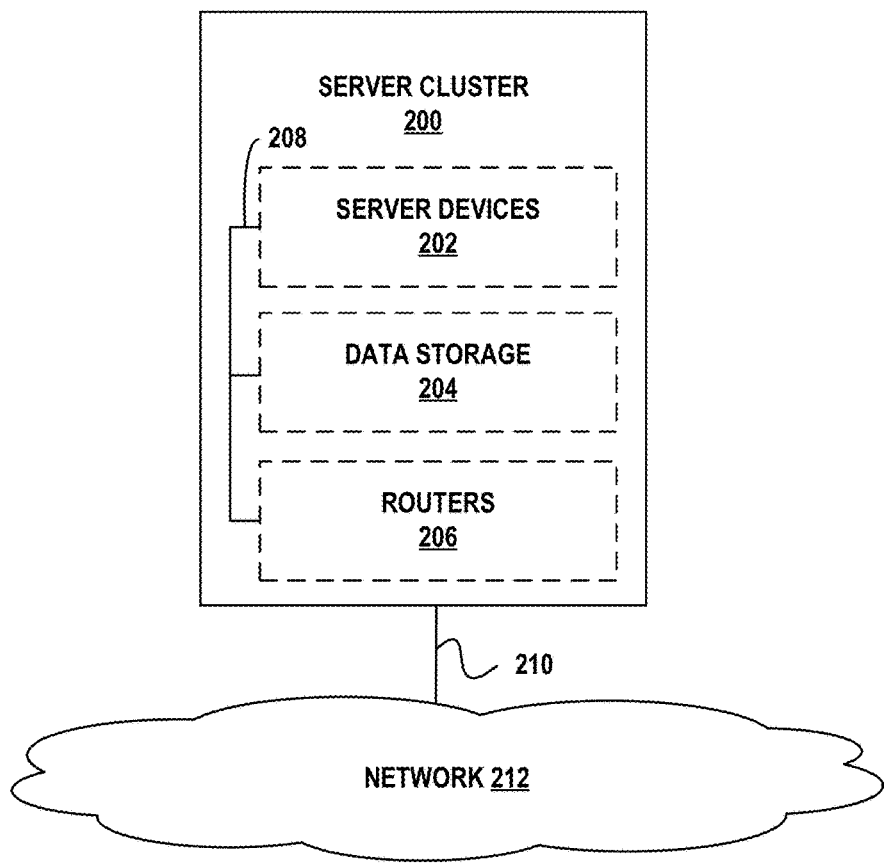
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as "a server device." This nomenclature should be understood to imply that one or more distinct server devices, data storage devices, and cluster routers may be involved in server device operations.

Data storage 204 may be data storage arrays that include disk array controllers configured to manage read and write access to groups of hard disk drives and/or solid state drives. The disk array controllers, alone or in conjunction with server devices 202, may also be configured to manage backup or redundant copies of the data stored in data storage 204 to protect against disk drive failures or other types of failures that prevent one or more of server devices 202 from accessing units of cluster data storage 204. Other types of memory aside from disk drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE TRANSACTIONS

The next sections illustrate several example types of transactions that may be supported by the embodiments described herein.

A. Example Consumer to Merchant Transaction

Figure 3:
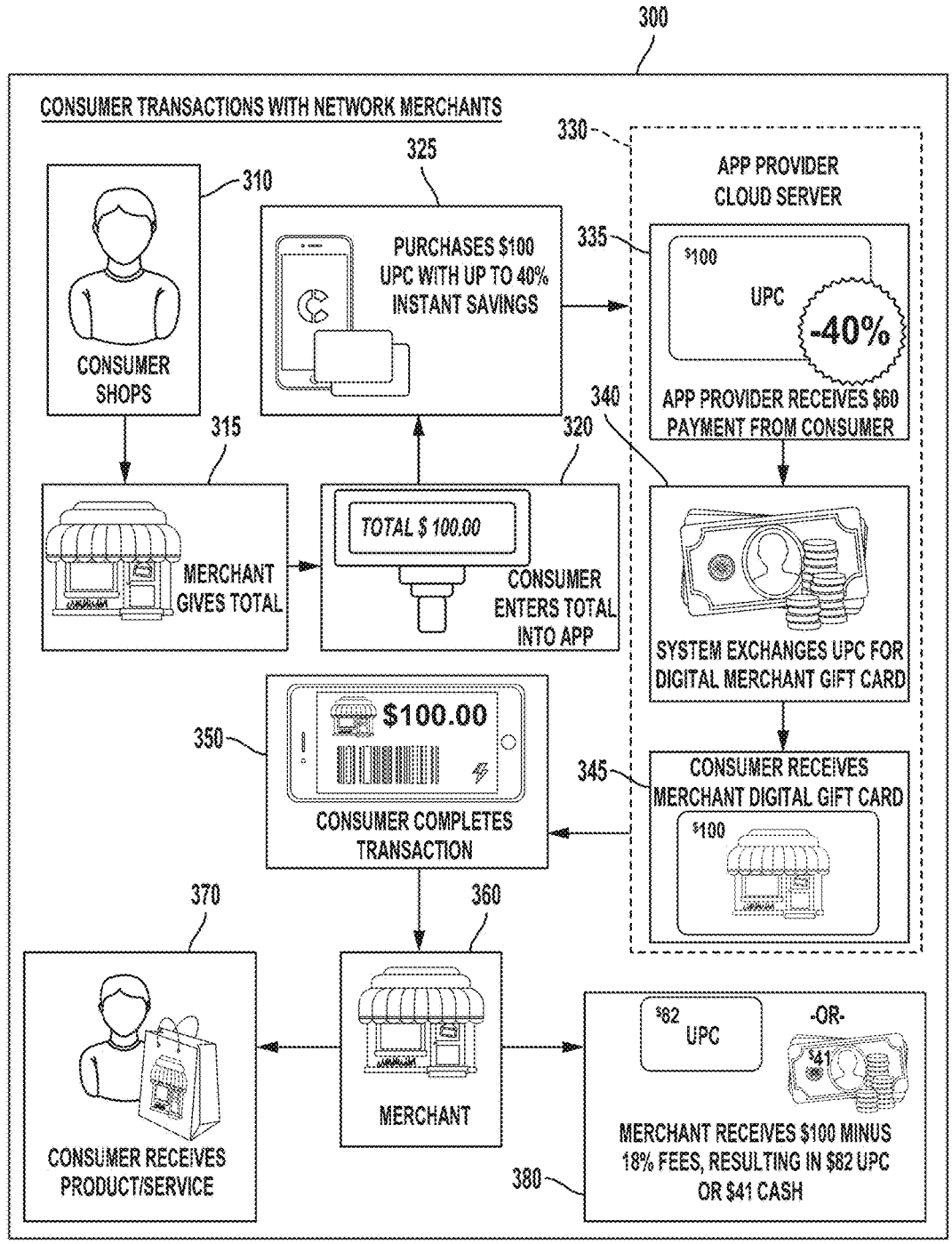
FIG. 3 is a block diagram that illustrates a process for consumer to merchant transactions, in accordance with example embodiments.

FIG. 3 illustrates a consumer to merchant transaction 300. At step 310, a consumer may find a merchant using an app on their mobile device. For instance, the mobile device may provide its location to the app provider's server device, and the server device may respond with a list of merchants within a given radius of the mobile device. This given radius may be a few dozen meters to a kilometer or more.

The consumer may select a particular merchant from this list and shop in that merchant's physical store, selecting merchandize to purchase. After receiving the total retail bill from the merchant at step 315, the consumer enters the total into the app (or it may be automatically entered electronically) at step 320. At step 325, the consumer purchases a discounted UPC for the exact face value of the transaction using the app. Note that from the consumer perspective, this portion of the transaction may be transparent. The consumer might not realize he or she is in fact purchasing a UPC, but rather merely entering a number into his or her mobile device. In some embodiments, this number may be entered automatically, e.g., by way of BLUETOOTH® or NFC.

Unlike traditional gift cards, which are limited to one merchant or a limited number of merchants (e.g., restaurants in a chain), the UPC herein is a "universal" gift card not limited to one particular retailer or company. Rather, it may be exchanged for and used by individual companies using those company's own gift cards, as will be described below in more detail.

As part of this transaction, the consumer may receive a discount on the price of the UPC, depending on offers that are present or the discounts to which the merchant has agreed. Such discounts could be, for example, up to 40% off. Thus, if a merchant offers 40% off to customers using the app provider's system, the $100 UPC provided at step 325 may actually cost the consumer only $60. The UPC may be paid for by the consumer using a linked automated clearing house (ACH) debit to a checking account, or to a linked credit card, or the consumer may be later invoiced for their purchases of the UPC.

Block 330 represents the app provider's cloud server system. At step 335, the UPC is paid for by the consumer using a pre-arranged consumer payment type, such as debit card, credit card, or ACH debit. At step 340, the UPC is immediately exchanged for a merchant gift card of the same face value in order to complete the transaction with the merchant for the retail amount. Thus, for example, if the consumer is shopping at hypothetical Merchant ABC, the UPC purchased at step 325 is exchanged for a Merchant ABC gift card with the same face value. The reasons for this dual card transaction will become clear after further explanation. The UPC becomes, in effect, a form of currency that can be spent by retailer and consumer alike.

At step 345, the consumer receives a digital gift card on their mobile device. A digital gift card is the same as a physical one, in that it has a card number and possibly a personal identification number to use with the card. This data may be then scanned optically, transmitted wirelessly (e.g., BLUETOOTH®, NFC, or RFID) or by other means, to the merchant check-out terminal. Since the digital gift card is for the exact amount due, no change or refund or balance on the digital gift card is needed.

Since the digital gift card is the store's own brand of gift card, no changes are necessary to the merchant checkout terminal in order to accept payment. This latter aspect is a powerful feature as the merchant need not reprogram retail point-of-sale terminals or otherwise change their front-end software to accommodate the system. As far as the merchant is concerned, a regular payment using the merchant's own branded gift cards has been made.

At step 350, the consumer has completed the transaction. The entire process is seamless and transparent to the consumer—and nearly instantaneous, so no delay in the checkout line occurs. In fact, the process may be faster than traditional credit card processing, and certainly faster that paying by cash or check. As a result, checkout times are faster and fewer checkout clerks are needed. Also, the entire process is readily adaptable to self-checkout lines with little or no changes.

At step 360, the merchant completes the transaction, and the consumer obtains their goods or services at step 370. The merchant may be paid in one of two ways. The merchant may receive payment for the full amount, minus processing fees, in the form of a UPC, or they may receive payment in cash for the purchase price of the card, minus the processing fees. The former is an incentive for the merchant to keep their money in the UPC system, which in turn acts as a form of currency for retail and business-to-business transactions. If the merchant would rather "cash out" they would receive a lesser amount of currency (in the form of ACH deposit or the like) instead.

An example of a transaction will illustrate how the system works. For instance, assume the total retail price for the goods or services is $100. The "instant reward" (set by agreement between the merchant and the app provider) via the app is 25%. This reward is designed to encourage consumption by the consumer, much in the manner of a coupon offer. Thus, at step 325, the consumer thus "purchases" a $100 UPC at a discount for only $75. The consumer does not actually physically receive a physical UPC, nor does he or she receive it electronically, as it is instantly converted in the app provider's cloud server system to a merchant brand name digital gift card (for the corresponding merchant).

Thus, the $100 UPC is exchanged for a $100 merchant gift card at step 340. The consumer presents the digital merchant gift card via the app to the merchant at step 350 in order to complete the transaction. Network Merchants enter the gift card number generated by the consumer device, to confirm payment, via the online portal provided by the app provider at step 360. The Network Merchant may also choose to reconcile the transaction into the point of sale system, selecting "gift card" as the payment type at step 360. Network Merchants receive the entire retail value of the transaction, minus marketing and transaction fees of 15% and 3% respectively, to the balance of the UPC associated with their account, within a reasonable amount of time, e.g., 24-72 hours ($100−18%=$82 added to balance).

Some or all revenue is deposited to the app provider's liability account. Income to the app provider is recognized as the difference between the total revenue collected and the total liability for all UPC held by merchants, after the cost of goods sold. Network Merchants may choose to sell the UPC back to the app provider. In such cases, the cash liability of the UPC has been permanently established as being equal to fifty percent of face value. Thus, $41 in cash is held in the liability account to offset an $82 UPC value until that liability is either reduced via merchant fees or eliminated through a UPC buyback. That is, 50% of $82=$41 cash liability. $75 total revenue COGS. $41 merchant liability=Income to the app provider. Note that Brand Merchants might not participate in the network using UPCs.

B. Example Merchant to Merchant Transaction

Figure 4:
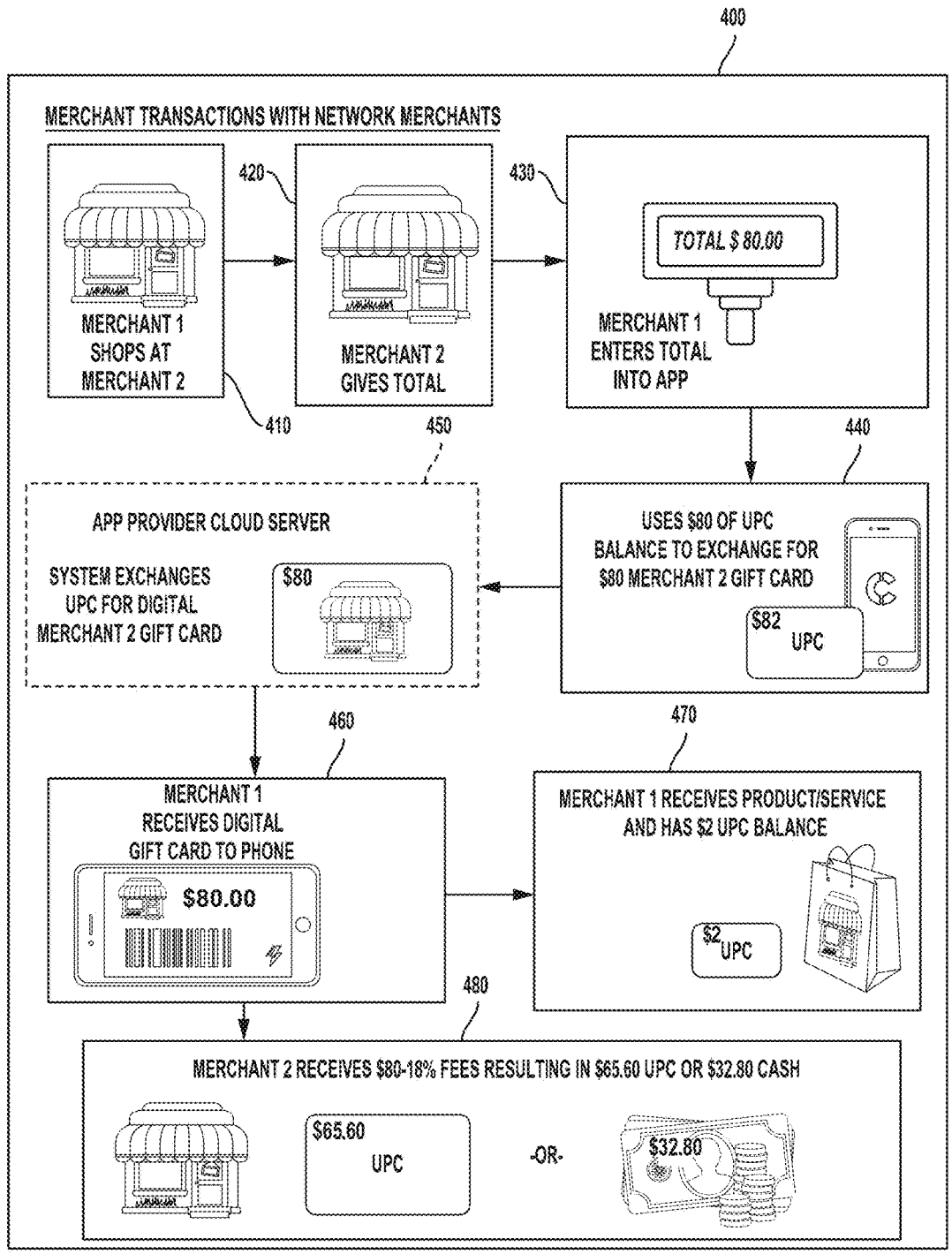
FIG. 4 is a block diagram that illustrates a process for network merchant transactions, in accordance with example embodiments.

FIG. 4 is a block diagram 400 illustrating the steps and components in network merchant transactions. Network Merchants may use a UPC in three types of transactions: purchasing from other Network Merchants, exchanging for Brand Merchant gift cards, and selling some or all of the gift card balance back to the app provider.

Network Merchants using a UPC as the source of funding are not eligible for instant cash savings when purchasing from other Network Merchants in the network because they are not purchasing with cash. However, Network Merchants that purchase using a credit or debit card on file as the primary source of funding are eligible. In the latter scenario, the Network Merchant participates in a similar manner as consumers, as outlined in FIG. 3. Marketing and transaction fees of may be charged by the app provider to Network Merchants based on the retail value of purchases made by both consumers and merchants. These fees may be 15% and 3%, respectively, or some other value.

At step 410 of FIG. 4, Network Merchant 1 shops at Network Merchant 2. At step 422, Network Merchant 2 provides a total of the sale. In this example, Network Merchant 1 is making an $80 retail purchase, starting with an $82 initial UPC balance from FIG. 1 (Network Merchant 1 is left with a $2 UPC balance upon completing the transaction).

At step 430, Network Merchant 1 enters the total ($80) into the app on their mobile device or on their computer system. Alternatively, Network Merchant 1 may enter the total by way of a web page, for example a web page from an e-commerce site of Network Merchant 2. At step 440, the app uses $80 of the UPC balance to generate a brand-name Network Merchant 2 digital gift card for the amount of $80. At step 450, the app provider cloud server system performs the exchange of the UPC for the Network Merchant 2 digital gift card, and, at step 460, transfers the Network Merchant 2 digital gift card to the mobile device (or other device) of Network Merchant 1. Alternately, the gift card may be directly sent to Network Merchant 2, as this is a merchant-to-merchant transaction.

At step 470, Network Merchant 1 receives their product or service, and has a balance of $2 in their UPC with the app provider. At step 480, Network Merchant 2, receives their $80 payment minus appropriate fees, in the form of an app provider UPC or cash. If Network Merchant 2 selects the UPC, they have 18% of $80, or $65.60, added to the balance of their UPC and are now paid in full. If the Network Merchant 2 selects cash, they would receive $32.90 in the form of a check, ACH deposit, or other form of payment.

Fees assessed by the app provider reduce the outstanding liability created by non-cash, UPC entries, and are offset by collected cash funds. Incremental revenue is realized each time the liability is reduced. As the cash value of the UPC may be valued constantly at fifty cents on the dollar, an 18% fee from $80 results in a $7.20 reduction in liability, which can now be moved to the app provider's operating account as incremental gross margin (18% of $80 is $14.40, and 50% of $14.40 is $7.20 in liability reduction/incremental gross margin. The process can be repeated indefinitely until the UPC balance is depleted or until the Network Merchant chooses to exercise either of the options outlined below.

Network Merchants may exchange UPCs for any available Brand Merchant gift card. However, depending upon the app provider's contract with each Brand Merchant, the exchange rate may vary between brands. Network Merchants may alternatively choose to sell back any or all of the UPC balance to the app provider at 50% of face value. An $82 UPC sold back to the app provider may result in a $41 payment to the Network Merchant, completely reducing the app provider's liability for that UPC.

Network Merchants may use their UPCs in three types of transactions. First, they may purchase from other Network Merchants, as illustrated above in connection with FIG. 4. Second, they may exchange Brand Merchant prepaid cards with one another in a merchant card to merchant card swap. Third, they may sell some or all of the prepaid card balance back to the app provider. Since the merchant cards and UPCs are stored electronically, the resale or swap of these cards does not require the manual labor previous solutions to prepaid card re-marketing.

Network Merchants using a UPC as the source of funding might not be eligible for instant cash savings when purchasing from other Network Merchants in the network because they are not purchasing with cash. However, Network Merchants that purchase using a credit or debit card on file as the primary source of funding are eligible. In the latter scenario, the Network Merchant participates in a similar manner, as outlined above in FIG. 1, with one Network Merchant taking on the role of the consumer in a transaction with another Network Merchant.

Marketing and transaction fees (e.g., of 15% and 3% respectively) may be charged by the app provider's server device to all selling Network Merchants based on the retail value of all purchases made by both consumers and merchants. Assuming an $80 retail purchase, and starting with an $82 initial UPC balance on the Network Merchant buyer's UPC, the Network Merchant buyer is left with a $2 balance upon completing the transaction. Meanwhile, the Network Merchant seller has 18% of $80, or $65.60, added to the balance of its UPC, and is now paid in full.

Fees assessed by the app provider reduce the outstanding liability created by non-cash, UPC entries, and are offset by collected cash funds. Incremental revenue is realized each time the liability is reduced. As the cash value of the UPC may be valued at fifty cents on the dollar, an 18% fee from $80 results in a $7.20 reduction in liability, which can be moved to the app provider's operating account as incremental gross margin. The process can be repeated indefinitely until the UPC balance is depleted or until the Network Merchant chooses to exercise either of the options outlined below.

Network Merchants may exchange the UPC for any available Brand Merchant prepaid card. However, depending upon the app provider's contract with each Brand Merchant, the exchange rate may vary between brands. Network Merchants may alternatively choose to sell back any or all of the UPC balance to the app provider at, for instance, 50% of face value. In this case, an $82 UPC sold back to the app provider will result in a $41 payment to the Network Merchant, completely reducing the app provider's liability.

C. Example Revenue Sharing Merchant Transactions

Figure 5:
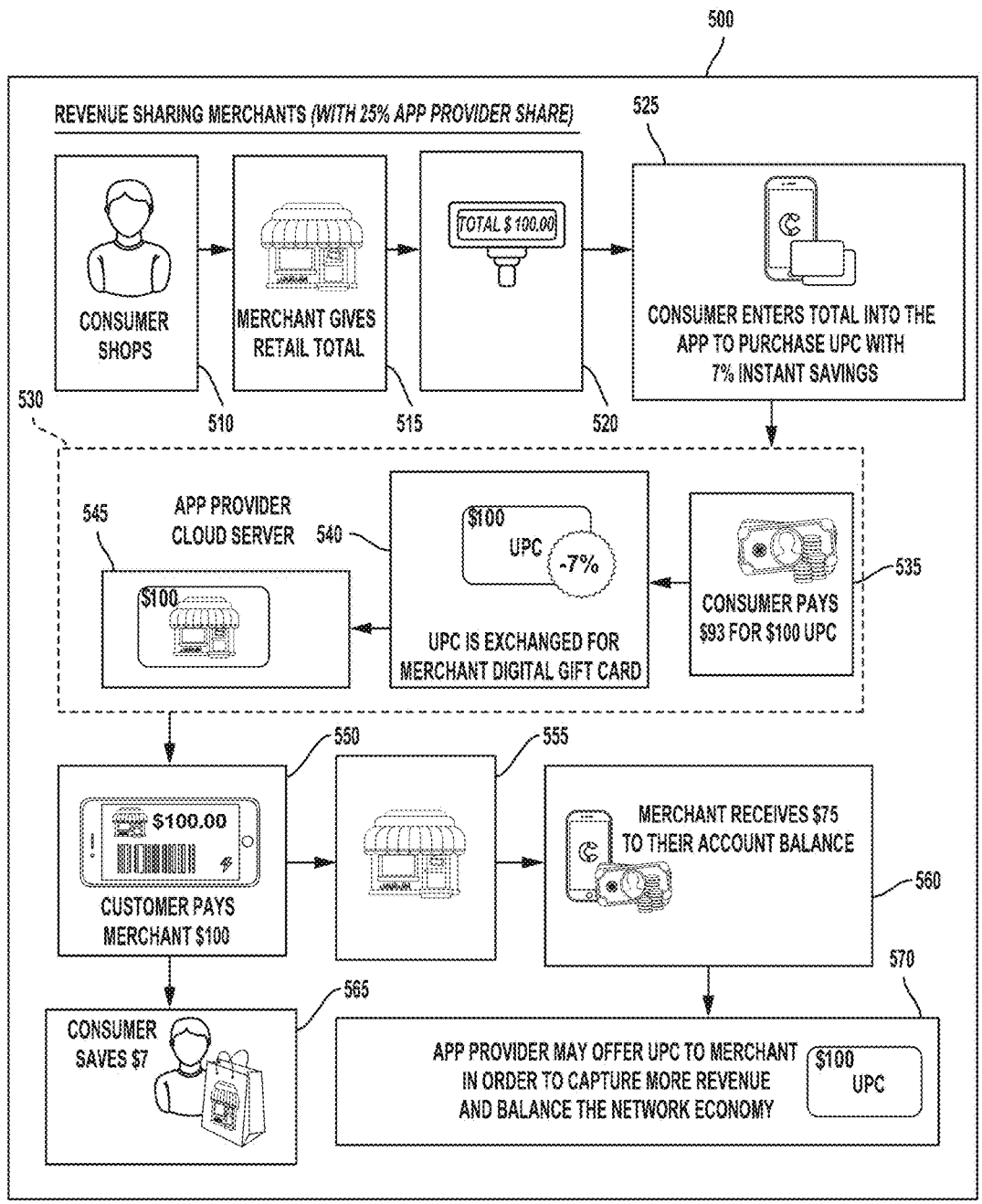
FIG. 5 is a block diagram that illustrates a process for revenue sharing merchant transactions, in accordance with example embodiments.

FIG. 5 is a block diagram 500 illustrating the steps and components for revenue sharing merchant transactions. At step 510, a consumer shops at a retail merchant as in FIG. 3. At step 515, the merchant rings up the retail total of $100, as illustrated at step 520. The consumer enters the total in the app on their mobile device. Alternatively, the total may be automatically provided (e.g., wirelessly) to the app. At step 525, the consumer purchases a UPC which, in this instance, provides 7% in instant savings, as per an agreement previously made between the merchant and the app provider, and as advertised to the consumer to entice them to shop with the merchant.

At step 535, the consumer then pays the app provider $93 (with the 7% instant savings) in the app provider's cloud server 530 to purchase the $100 UPC. The UPC is instantly exchanged at step 540 for a merchant gift card 545, which may be accepted by the merchant directly, without any need to alter the merchants POS terminals or programming.

At steps 550 and 555, the consumer pays the merchant with the merchant gift card, which is in digital form on the consumer's mobile device. At step 565, the consumer receives their merchandise or service, and saves $7 on the purchase. The consumer realizes instant savings and is incentivized to shop with the merchant and to use the app. At step 560, the merchant receives $75 to their account balance as per the agreement with the app provider, which pays 75% of the face value of the UPC. Optionally, as illustrated at step 570, the app provider may offer a UPC to the merchant with a higher value than the cash payment in step 560, to incentivize the merchant to keep revenue within the system. The merchant may then spend the UPC using the steps of FIG. 4.

IV. EXAMPLE CLIENT-SIDE AND SERVER-SIDE PROCESSING

Figure 6A:
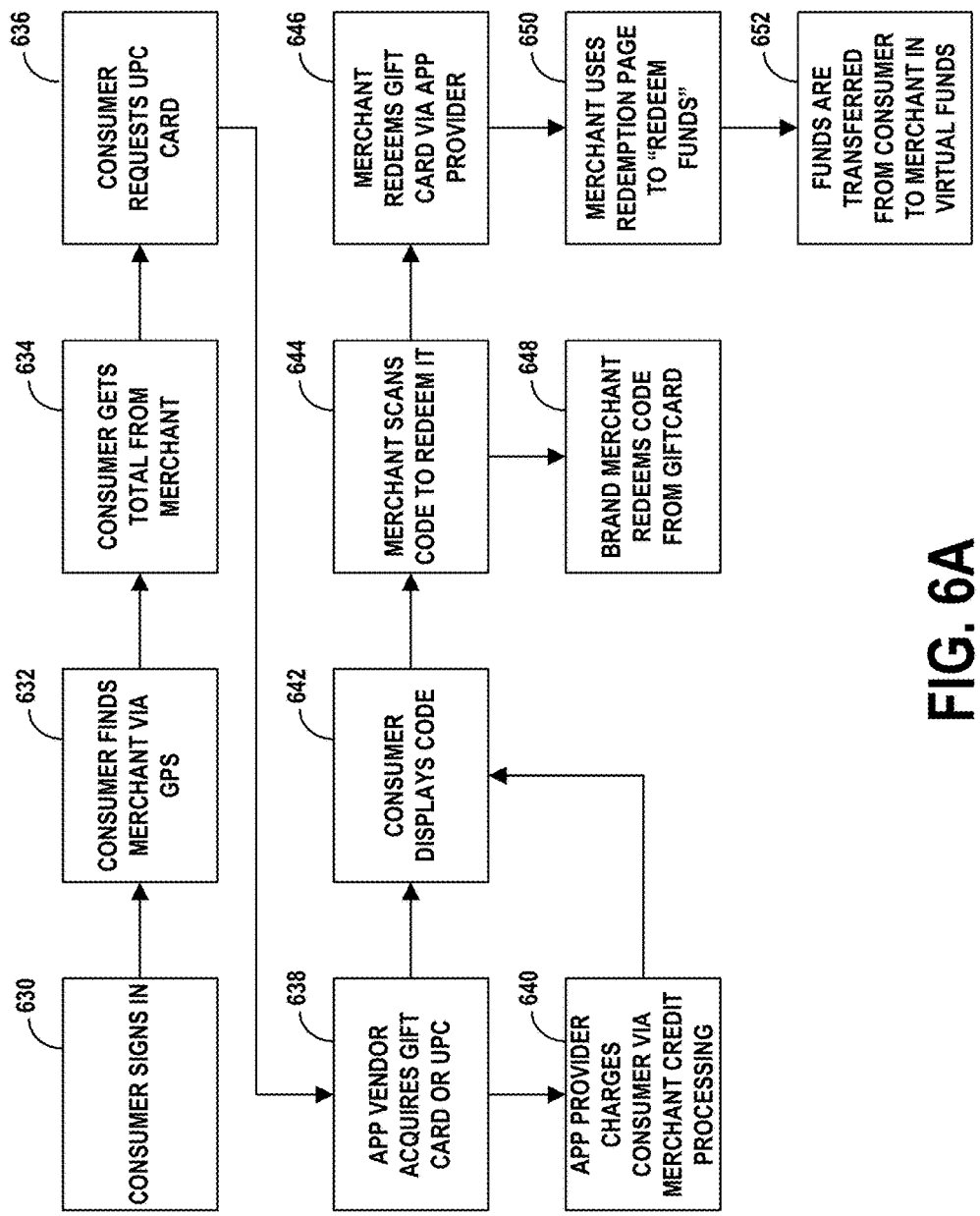
FIG. 6A is another block diagram that illustrates a process for consumer to merchant transactions, in accordance with example embodiments.

With reference to FIG. 6A, the following steps describe the process a consumer may undertake to make a payment to a merchant who accepts the app provider's service. Step 630 represents the consumer signing into the application on their mobile device. At step 632, the consumer may find a merchant using the app on his or her mobile device. The mobile device may locate a vendor from a list of approved merchants in a local area via GPS or other location technology. The consumer then shops as they normally would, selecting merchandize to purchase. After receiving the total retail bill from the merchant at step 634, the consumer enters the total into the app (or it may be automatically entered electronically) at step 636. At step 638, this results in the consumer purchasing a discounted UPC (or using a balance on an existing UPC) for the exact face value of the transaction.

Note that from the consumer perspective, this portion of the transaction may be transparent. Step 638 represents the app provider acquiring a UPC on the consumer's behalf, or issuing credits on the app provider's network. Step 640 represents the app provider charging the consumer for the value of the card assigned via internal merchant credit processing. By doing so it validates the request for credit.

Step 642 represents a barcode and/or card number being presented to the consumer via the mobile application. At step 644 the consumer presents the barcode for redemption to the merchant who scans the code, or inputs the number to redeem the value of the card that was assigned. Step 646 represents the merchant redeeming the card value using via an Internet connection.

Step 648 represents Brand Merchants redeeming a gift card code acquired from a third party service. Step 650 represents merchants utilizing the redemption page and service in the app provider management application, available only to employees, managers, and owners of Network Merchants, and available to cashiers at Brand Merchants using their own service. Step 652 represents the transfer of virtual funds from the consumer to the Merchant, increasing the merchants balance in network funds (UPC).

Figure 6B:
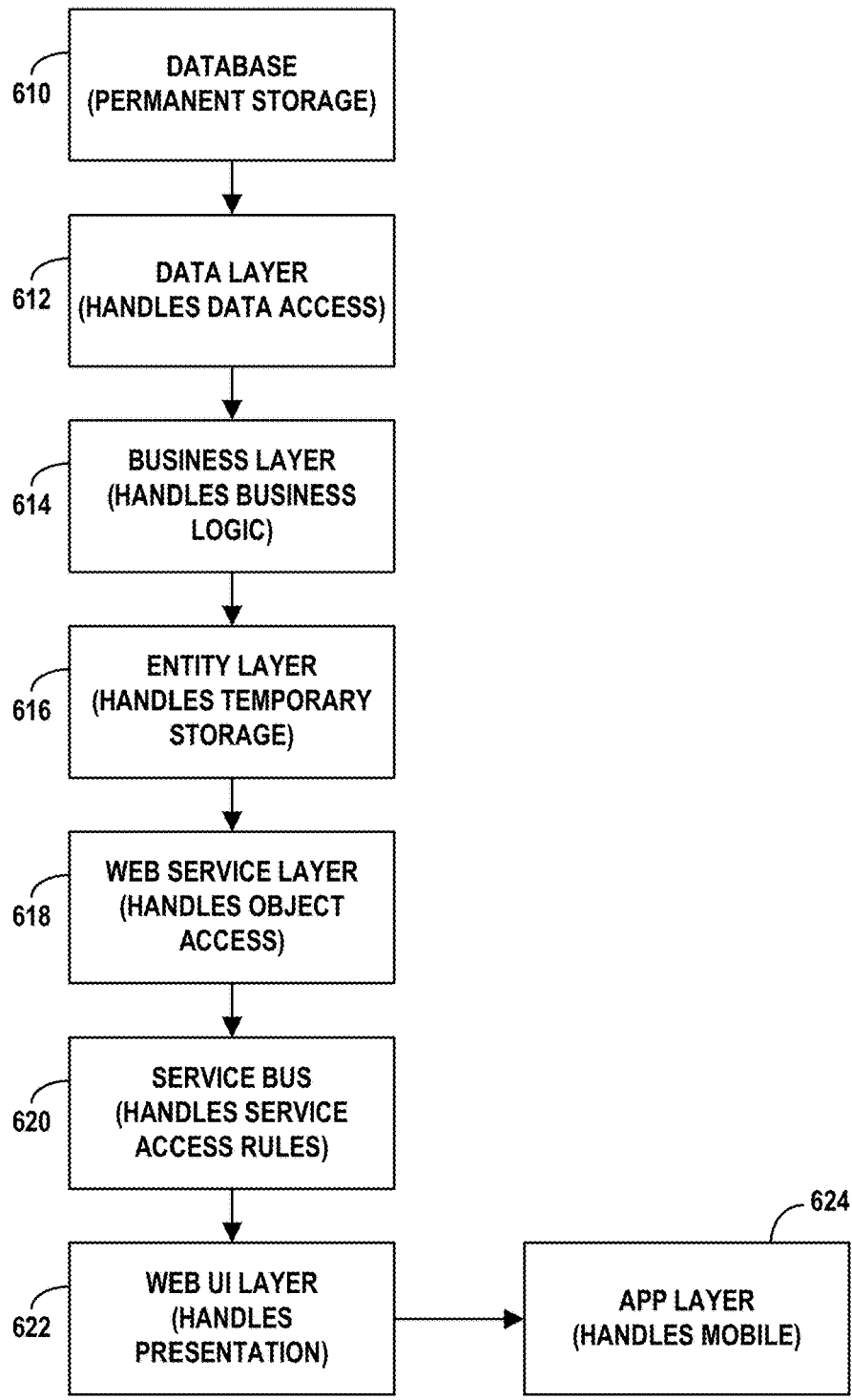
FIG. 6B is a block diagram that illustrates a logical hardware and software architecture of the system, in accordance with example embodiments.

With reference to FIG. 6B, the technical infrastructure and hardware architecture of the app provider server-side system is defined. Block 610 represents a persistent data storage layer utilized for the app provider. This may be, for example, a third-party cloud-based service that provides and services gift cards. Block 612 represents a data layer that acts as an interface between the persistent data storage of block 610 and the temporary data storage layer of block 616.

Block 614 represents a business layer exists that handles business rules, business logic, and data validation on data that flows between user interface layer 622, temporary storage layer 616, and persistent storage layer 610. Block 616 represents an entity layer that acts as a temporary storage location for data that will be utilized in the user interface layer 622 or consumed by web service layer 618. Block 618 represents a web service layer that defines a basic interaction point between service bus layer 620 and persistent storage layer 610. Particularly, service bus layer 620 is a point of interface for both application user interface and mobile application user interface, and also interfaces with third party solutions by way of a standardized method of accessing data.

Block 622 represents a web user interface layer that is the administration website, for consumers, merchants, and administrators to access relevant app provider data. Block 624 represents a mobile middleware layer that provides a common platform for developing and deploying the app on multiple mobile device types (e.g., IOS®, ANDROID®, and WINDOWS®). These applications access data via the service bus layer 620, and utilize entity layer 616 as a place to store temporary data, as well as persistent storage layer 610.

Figure 7:
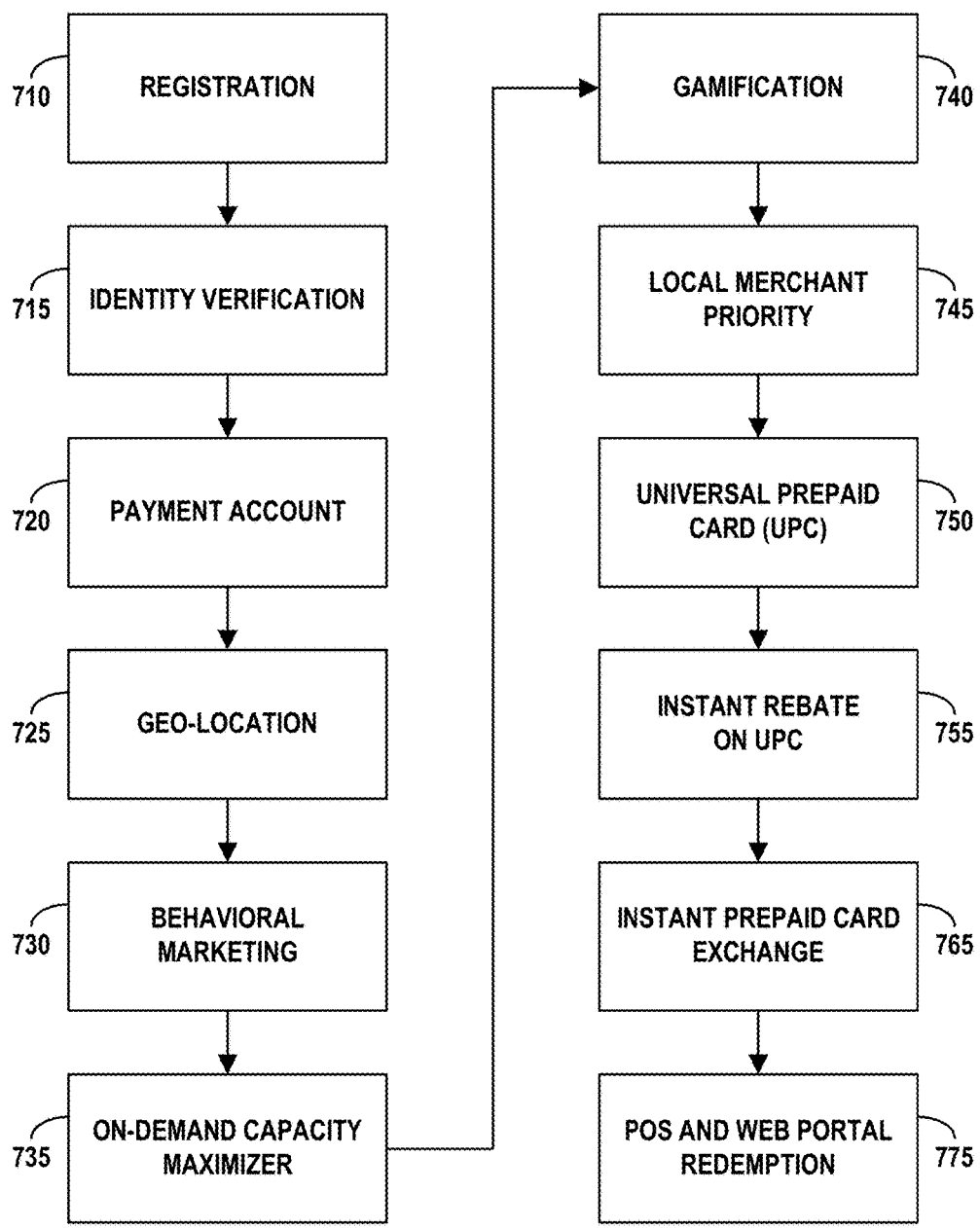
FIG. 7 is a block diagram that illustrates a workflow, in accordance with example embodiments.

With reference to FIG. 7, the following steps describe example system processes and characteristics. Some of these steps, such as behavioral marketing and gamification, may be optional.

Step 710 represents registration. In this step, a consumer registers for the app provider service. The consumer may download the app to his/her mobile device and create an account, for instance with a username and password.

Step 715 represents identity verification. In this step, the consumer's identity is verified, using one or more techniques, such as verifying data from the consumer's credit report or other identifying information. This step may be helpful in preventing a consumer from setting up a phony or fraudulent account.

At step 720, the consumer sets up a payment account for use in paying for transactions by way of the app. This payment account may comprise a credit card account, a debit card, an ACH debit to a checking account, or other payment account. In addition to entering a credit card and/or debit card, a financial institution or strategic partner may offer to their consumers and business customers a payment mechanism, account, or line of credit against which purchases are posted. Each card or partner account may become an option for payment by consumer. Verification of cards or accounts may take place to confirm legitimacy.

At step 725, geo-location may be used by the app, by way of the internal GPS functionality and/or geo-locating abilities of the mobile device, to display a list of nearby participating merchant locations and online retailers. Each merchant listing represents a possible prepaid card for sale to the consumer.

Step 730 represents behavioral marketing. In combination with listings that result from geo-location, consumers are also presented with prepaid card listings based on a multitude of factors, some of which may be: time from last purchase, amount of purchase, day of the week, time of day, promotion of a specific listing, popular trends, and the like. For example, a consumer may be passing by a pet store and an algorithm running on the app provider's server device may determine that the consumer is likely in need of dog food, based on past consumption habits. An offer may appear on the consumer's mobile device suggesting a purchase of dog food at the pet store.

At step 735, an on-demand capacity maximizer uses variable inputs defined by a merchant regarding their high and low peak activity hours to market prepaid cards to consumers on-demand during low consumer activity periods in conjunction with geo-location and behavioral history. Thus, for example, during peak "busy" periods, incentives may be lower than in times of less demand.

Step 740 represents gamification, which is also used as a way to promote a business or product implemented with a series of points, levels, badges, and achievements for consumers based on a multitude of behaviors such as volume spent, dollars saved, merchants shopped, friends referred, and the like.

Step 745 represents local merchant priority. Together with behavioral marketing in step 730, keywords and tags may be used to prioritize local merchant listings in any case where the initial search criterion (or the result) is associated with a competitive national brand listing. This unique feature uses the search of a nationally recognized brand by the consumer to identify opportunities to purchase a prepaid card associated with a competitive local brand.

At step 750, the UPC is purchased by the consumer when a purchase is made at a participating retailer. The UPC is used to temporarily hold funds prior to exchange with any merchant prepaid card. The use of the UPC has been described above in connection with FIG. 3.

At step 755, an instant rebate ("instant reward" or "instant savings" as illustrated in FIG. 3) may be applied to the UPC. An immediate rebate on the purchase of a UPC may be determined by a multitude of factors: offers available from merchant, total volume of purchases within a given time frame by consumer, payment account type used to fund, promotional offers, popular trends, and so on.

At step 765 an instant prepaid card exchange takes place. Selecting a merchant listing with an advertised instant rebate, and purchasing the resulting UPC, creates a one-way exchange of the UPC with a merchant prepaid card, as defined in the selected listing. In step 775, the merchant prepaid card is redeemed at the point of sale or on the web (e-commerce site). The merchant that are recognized as national brands typically have a prepaid card system in place for payment redemption. For merchants that do not have a prepaid card system in place, tools are provided for prepaid card redemption through a cloud-based portal. In addition to redeeming a prepaid card, refunds may also be initiated by a merchant via the same portal.

Figure 8:
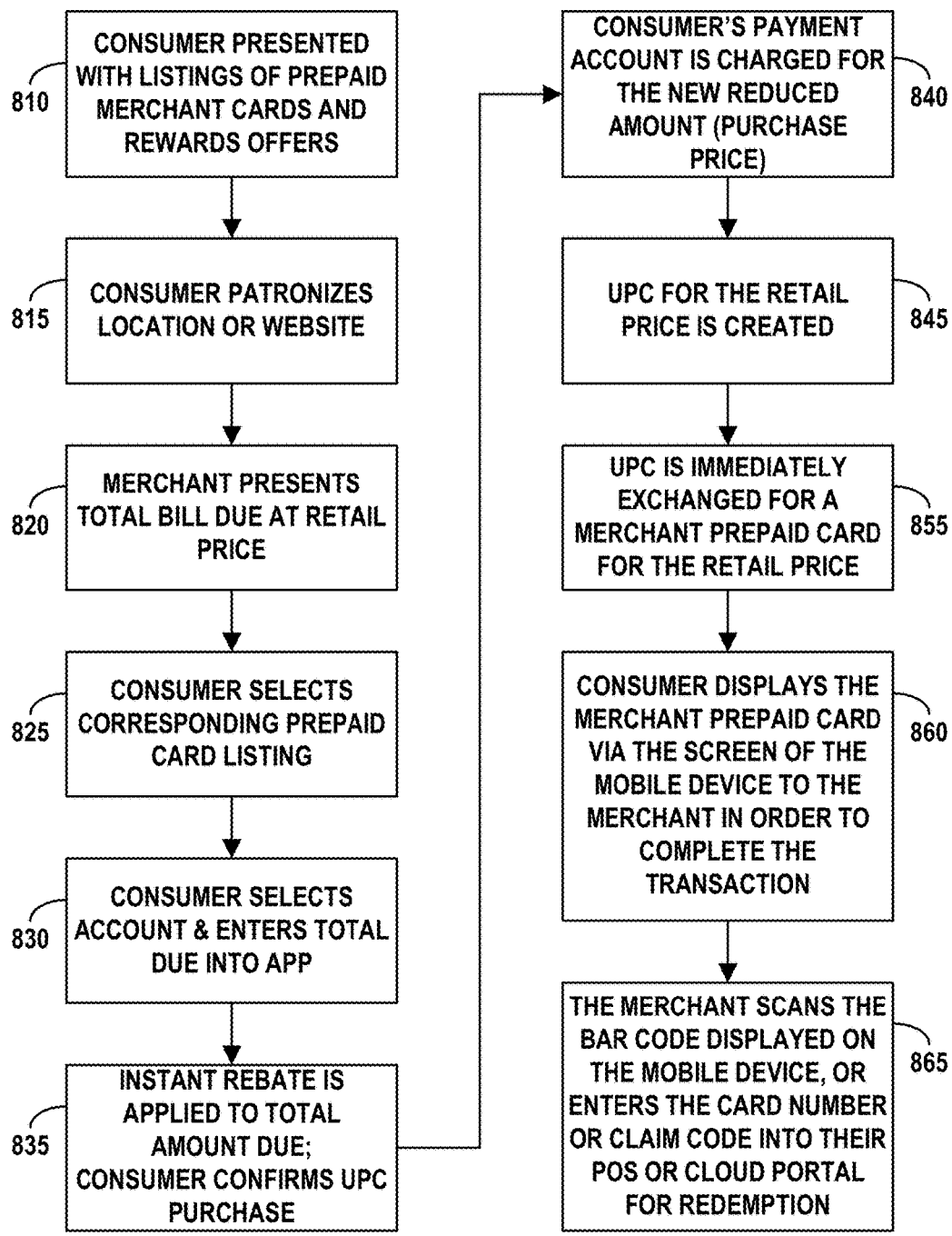
FIG. 8 is a block diagram that illustrates purchasing a product using a prepaid card, in accordance with example embodiments.

With reference to FIG. 8, the following are the steps used when purchasing a product using a prepaid card. In step 810, a consumer is presented with listings of merchant prepaid cards and instant reward offers via the app. In embodiments where the purchase is made from a website via computer, these processes may occur on a personal computer or another type of computing device.

At step 815, the consumer patronizes the merchant location or website. At step 820, the merchant presents total bill due from the consumer (e.g., for the retail price of the desired goods or services). In step 825, the consumer selects corresponding prepaid card listing from the application on his or her mobile device. At step 830, by way of the app, the consumer selects a payment account and enters the total amount due. This step may be automated by using electronic communication between the merchant POS terminal and the mobile device. For website purchases, the process may be automated such that the consumer need only accept the purchase on their mobile device or personal computer.

At step 835, the instant rebate is applied to total amount due, and consumer confirms purchase of a UPC and exchange of the UPC for a merchant prepaid card. Again, the steps in block 835 may be partially or fully automated, such that the purchase and exchange of the UPC is transparent to the consumer.

At step 840, the consumer's payment account, which had been previously set up in step 720 of FIG. 7, is charged for the new reduced amount (e.g., the actual purchase price). At step 845, a UPC for the retail price is created on the app provider's server device. At step 855, the UPC of step 845 is exchanged for a merchant prepaid card for the retail price.

At step 860, the consumer displays the merchant prepaid card via the screen of his or her mobile device to the merchant in order to complete the transaction. For online retailers, the consumer may simply enter the displayed information into the merchant website, or the data may be automatically transmitted from the app provider's server device. At step 865, the merchant scans the bar code displayed on the mobile device, or enters the card number or claim code into their POS or cloud portal for redemption.

An example of such a transaction as illustrated in FIG. 8 is as follows. Assume a total retail price is $100 and an instant reward via the app is 25%. The consumer purchases a UPC with a retail price and value of $100 at a purchase price of only $75. The $100 UPC is exchanged immediately for a $100 merchant prepaid card. The consumer displays the merchant prepaid card via the screen of the mobile device to the merchant in order to complete the transaction. The merchant receives payment (in the form of the reduced price for the merchant prepaid card) and the consumer receives their merchandise or service at a discount from the regular price.

Figure 9:
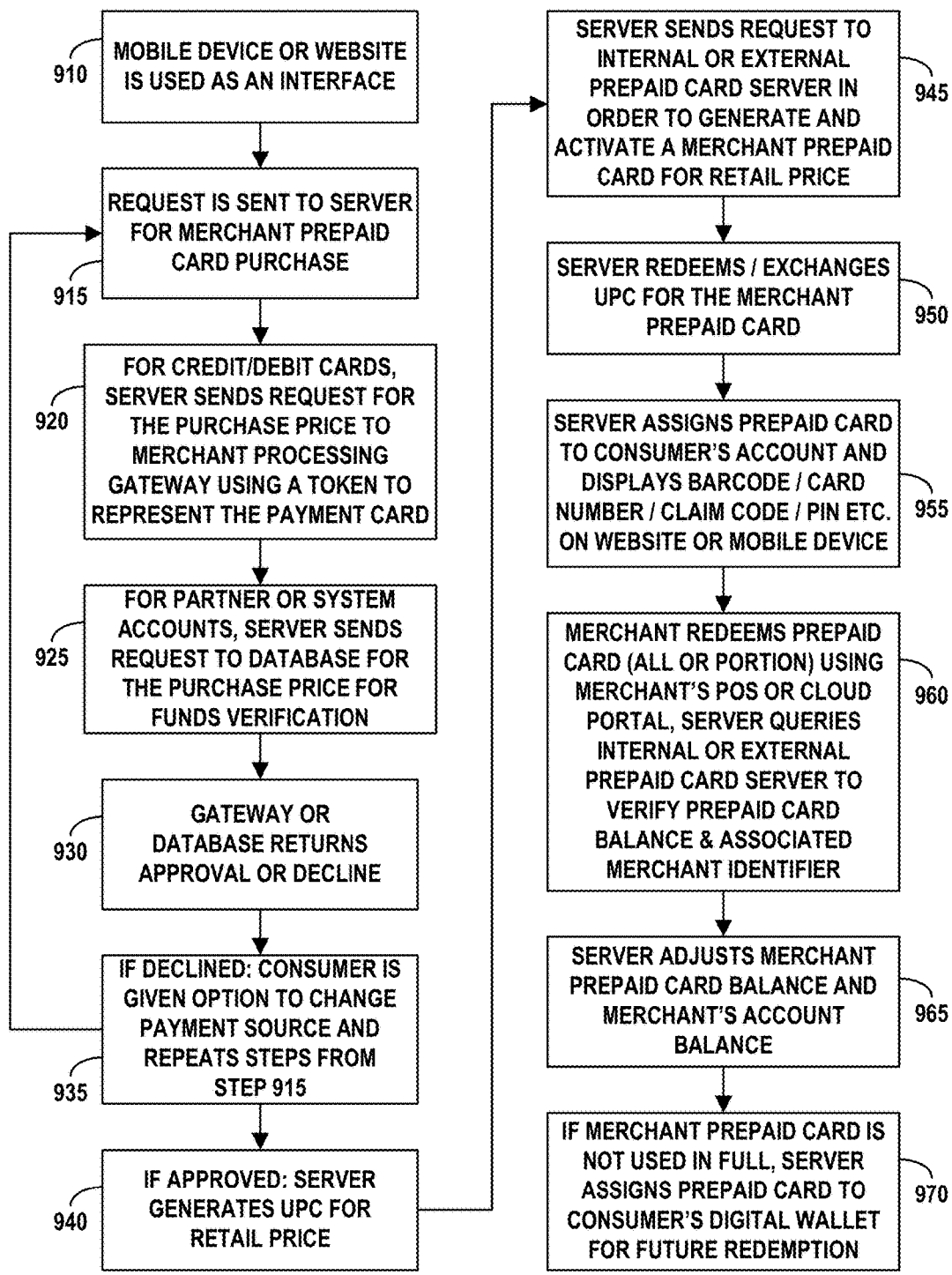
FIG. 9 is another block diagram that illustrates purchasing a product using a prepaid card, in accordance with example embodiments.

FIG. 9 is a block diagram of the system flow in accordance with example embodiments. At step 910, the consumer uses his or her mobile device or a website (e.g., via a computer or tablet device) to access an interface to the app provider's server device. At step 915, a request is sent to the app provider's server device for a merchant prepaid card purchase. At step 920, for credit or debit cards, the app provider's server device sends a request for the purchase price to a merchant processing gateway using a token to represent the payment card. (The system stores representations of payment cards in a third party vault.)

At step 925, for partner or system accounts, the app provider's server device sends request to a database for the purchase price to verify that the requisite funds exist. In step 930, the gateway or database returns approval or declines the transaction. If declined in step 935, the consumer is given the option to change payment the source and may repeat the process from step 915. At step 940, if the payment is approved, the app provider's server device generates a UPC for the for retail price of the purchase.

At step 945, the server sends a request to an internal (within the app provider's system) or external prepaid card server in order to generate and activate a merchant prepaid card for the retail price of the transaction, while assigning the merchant prepaid card to a unique merchant identifier. The merchant identifier may be associated with one or more locations.

At step 950, the server redeems or exchanges the UPC for the merchant prepaid card. The process occurs in a manner that may be transparent to the consumer and even the merchant. At step 955, the app provider server device assigns the merchant prepaid card to consumer's account and displays a barcode, card number, a claim code, PIN, or other identifying data on the mobile device. Alternatively, the app provider server device may transmit such data (automatically or manually) to the e-commerce website of the merchant, as applicable.

At step 960, when the merchant redeems prepaid merchant card (all or a portion thereof) using the merchant's POS or a cloud portal, the app provider's server device queries an internal (within the app provider's system) or external prepaid card server in order to verify the prepaid card balance and associated merchant identifier. In this embodiment, the prepaid merchant card may be for an amount different than the purchase price of the merchandise or service selected by the consumer.

At step 965, the server adjusts the merchant prepaid card balance and merchant's account balance accordingly, reducing the balance of the merchant prepaid card and crediting the merchant's bank account (or other financial account) with a credit for the sale transaction. At step 970, if the merchant prepaid card is not used in full, the app provider's server device assigns the unused portion of the prepaid card to consumer's digital wallet for future redemption.

Figure 10:
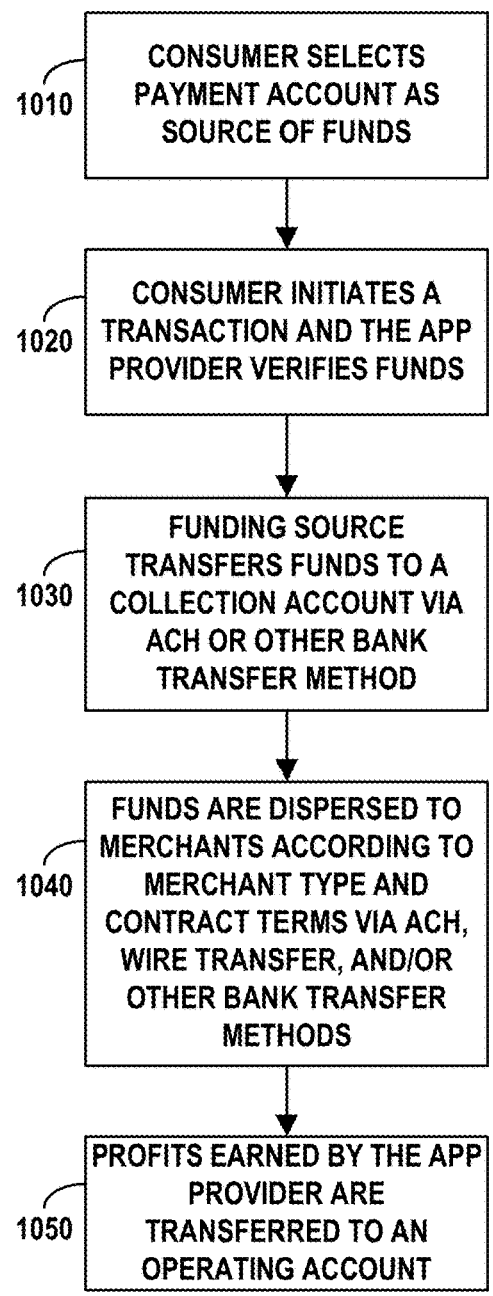
FIG. 10 is a block diagram that illustrates a flow of funds, in accordance with example embodiments.

FIG. 10 is a block diagram of an example flow of funds. At step 1010, the consumer selects payment account as source of funds. The payment account may be credit/debit card, or account from financial institution or business partner. At step 1020, the consumer initiates a transaction, and the app provider server device verifies that the consumer has the requisite funds. At step 1030, the funding source transfers funds to a collection account via ACH or other bank transfer method. At step 1040, funds are dispersed to merchants according to merchant type and contract terms via ACH, wire transfer and/or other bank transfer methods. At step 1050, profits earned by the app provider are transferred to an operating account.

In place of cash, network merchants may receive the entire retail value of a consumer transaction, minus marketing and transaction fees (e.g., 15% and 3% respectively). This value may be added to the balance of the merchant UPC account associated with the merchant's profile, within 72 hours (e.g., assuming the marketing and transaction fees above, $100 less 18%, or $82, would be added to balance). Income to the app provider is recognized as the difference between the total revenue collected and the total liability for all UPCs held by merchants, after the cost of goods sold.

V. EXAMPLE SERVER ARCHITECTURE

Figure 11:
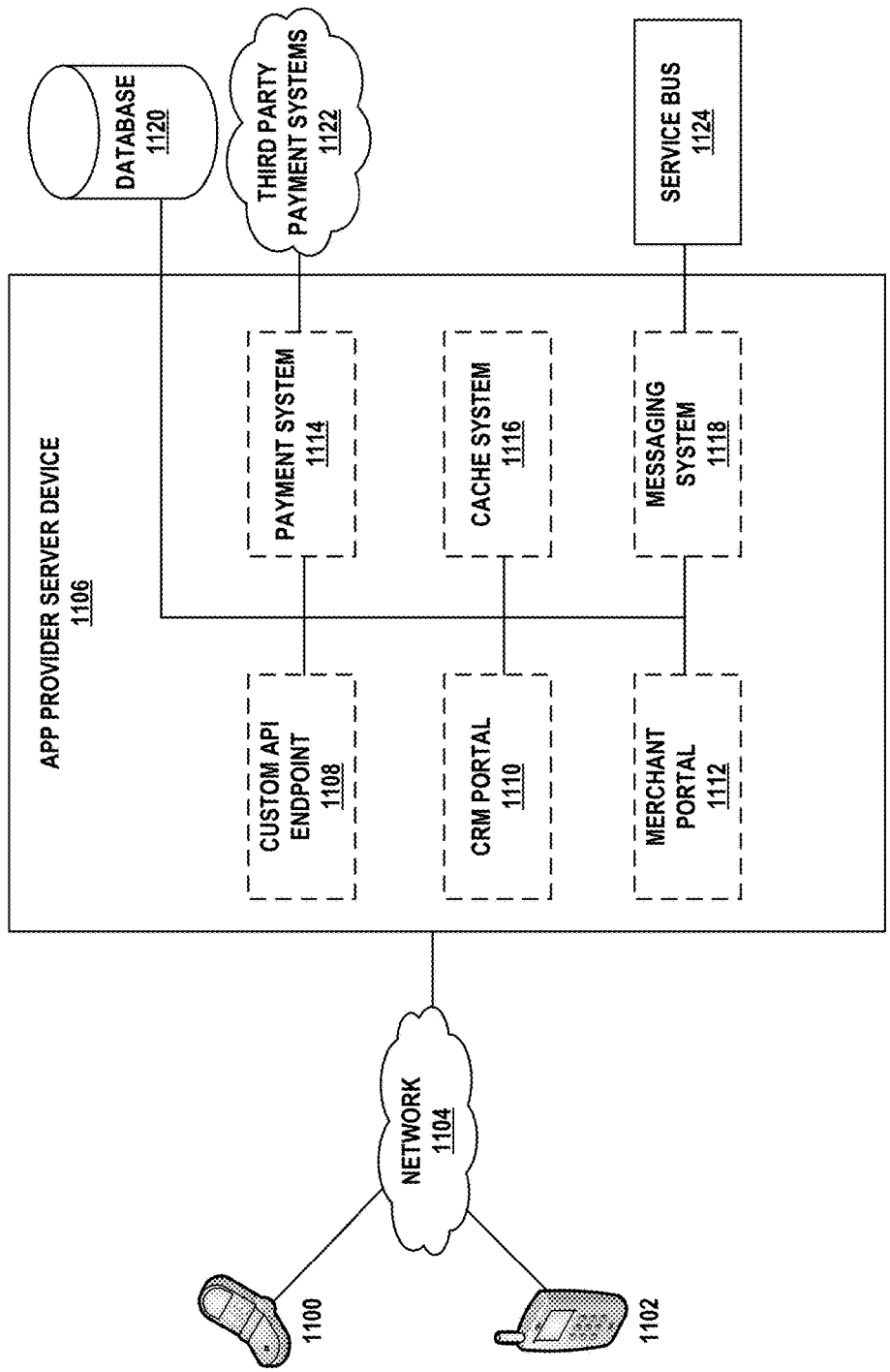
FIG. 11 is a block diagram of a server device configuration, in accordance with example embodiments.

FIG. 11 is a block diagram of an example system architecture. Included are mobile devices 1100 and 1102, network 1104, app provider server device 1106, database 1120, third-party payment systems 1122, and service bus 1124. Nonetheless, in some embodiments, additional components may be present, and/or components depicted in FIG. 11 may be removed.

A. Mobile Devices and Network

Mobile devices 1100 and 1102 may be smart phones or other types of wireless computing devices, such as tablet devices. Mobile devices 1100 and 1102 may be embodied by computing device 100, and an app operating thereon may be used to view and purchase gift cards, to manage favorite locations, and to check the status of a customer's reward level. This app may communicate over network 1104 with app provider server device 1106, and might store little or no information locally. For instance, all data may be delivered by HTTP request, using JavaScript object notation (JSON) as the transmission medium.

Network 1104 may be, for instance, the public Internet or one or more public or private packet-switched networks.

B. App Provider Server Device

App provider server device 1106 may include custom endpoint application programming interface (API) 1108, customer relationship management (CRM) portal 1110, merchant portal 1112, payment system 1114, cache system 1116, and messaging system 1118. However, in some embodiments, app provider server device 1106 may contain more or fewer modules, or the modules may be organized differently from the arrangement of FIG. 11. The components of app provider server device 1106 may disposed within one physical or virtual server, or distributed across multiple physical or virtual servers.

Custom API endpoint 1108 may be a web application that is the focal point for all apps deployed to mobile devices. For instance, these apps may communicate through this central location for all processing. Custom API endpoint 1108 may maintain state and coherency across the entire array of apps, and may be the final source of truth when it comes to the state of any object. Further, custom API endpoint 1108 may be the only module that is allowed to update the database, and may serve as a translator between internal processes and third-party applications. Custom API endpoint 1108 may be hosted on a cloud-based virtual machine to maintain PCI compliance when processing credit card information.

CRM portal 1110 may be a web application that allows app provider employees to update and/or modify customer data and merchant data. They can create schedules and manage tasks. CRM portal 1110 may also provide reporting on sales figures and provide real-time or near-time-time (e.g., within a few tens of seconds of real-time) feedback of how well an employee or sales group is performing. CRM portal 1110 may communicate with custom API endpoint 1108, and might store little or no information locally. Data may be delivered over HTTP request, using JSON as the transmission medium. This application may also be hosted on a cloud-based virtual machine.

Merchant portal 1112 may be a web application that allows merchants to update and/or modify their location and/or brand data. Merchant portal 1112 may provide a merchant with reporting on sales figures and will provide real-time or near-time-time feedback as to how well their gift cards are selling. Merchant portal 1112 may communicate with custom API endpoint 1108, and might store little or no information locally. Data may be delivered over HTTP request, using JSON as the transmission medium. This application may also be hosted on a cloud-based virtual machine.

Payment system 1114 handles transactions that procure and activate a gift card. It also conducts billing of credit cards and purchasing of gift cards by way of third-party services, and handles any problems that may arise for each transaction (e.g., voiding payments, cancelling orders). One or more transaction histories may be maintained in volatile memory, and may be cleared periodically of from time to time. This ensures that no credit card information beyond the last 4 digits is stored indefinitely on the local system.

Cache system 1116 may handle caching of data that rarely changes, but would be prohibitive to store in the database. This may include data such as distance calculations, and locations within range of customers. Cache system 1116 also allows distribution of workload across multiple computing devices if needed, instead of bottlenecking a single system.

Messaging system 1118 may handle communication with between customers and third parties. For messages being sent to a customer, the customer's preferences may be taken into account with respect to the preferred type of notifications, (e.g., SMS, email, social media, and so on).

Although not shown in FIG. 11, app provider server device 1106 may support a rewards system. This system may define and operate the gamification aspects of the system, and may be used when determining a tier to which a given customer belongs. The more the customer uses the system, and the more badges they unlock, the higher their tier. This, in turn, may lead to more discounts and savings for the consumer.

C. Third-Party or External Services

Database 1120 may be central repository of data used by app provider server device 1106. Database 1120 may be hosted in on a virtual machine, and may also be the final source of all truth. The database might only be able to be written to from custom API endpoint 1108, and service bus 1124 might only be able to read from it to gather information necessary for workflow processing.

Third-party payment systems 1122 may be a cloud-based service through which payment system 1114 can, for example, purchase a gift card, activate a gift card, void a transaction, and so on.

Service bus 1124 may be a third-party, cloud-based messaging platform that reliably delivers messages between applications and services even when one or more is offline.

VI. EXAMPLE MESSAGE FLOWS

Figure 12A:
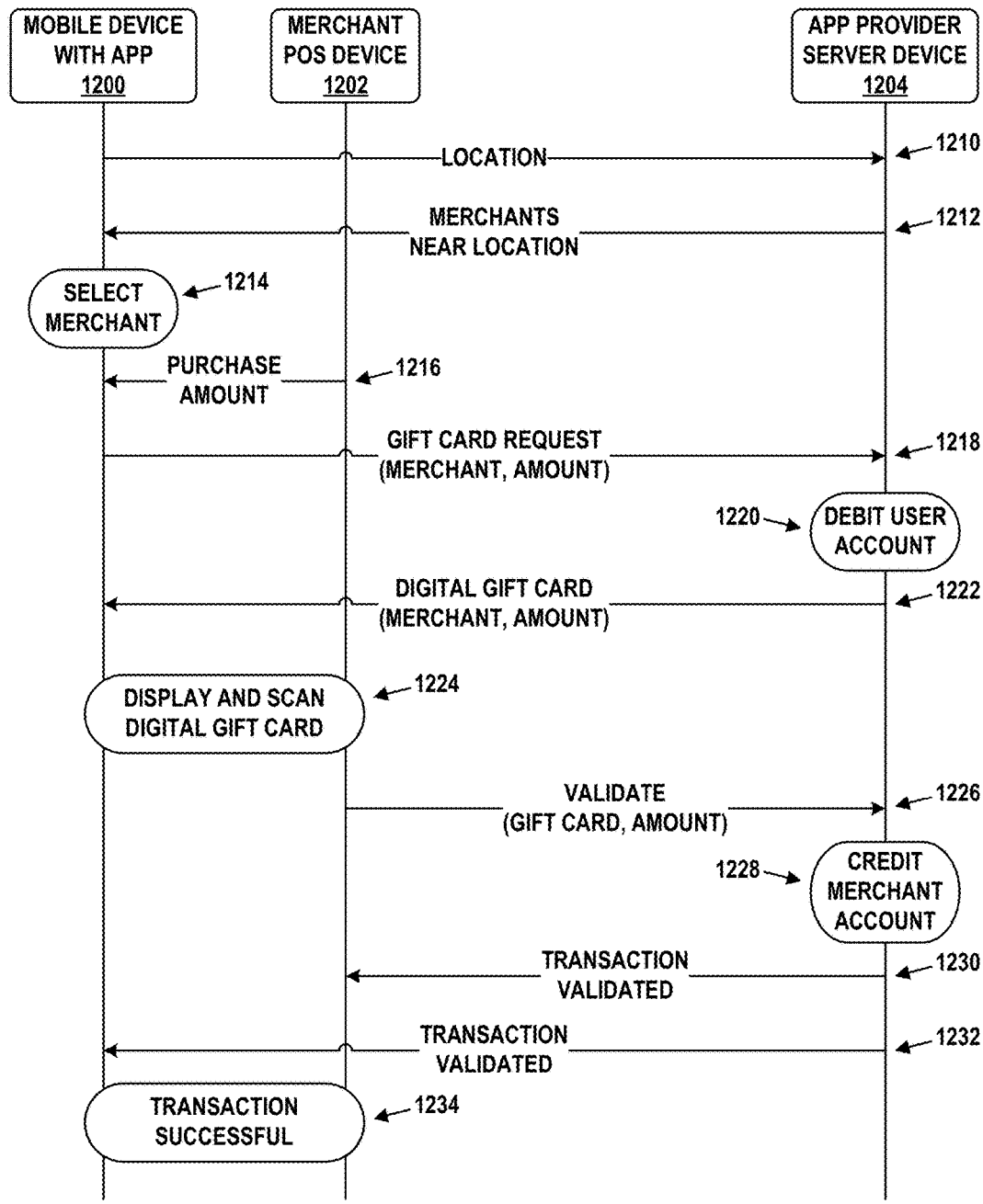
FIG. 12A is a message flow diagram, in accordance with example embodiments.
Figure 12B:
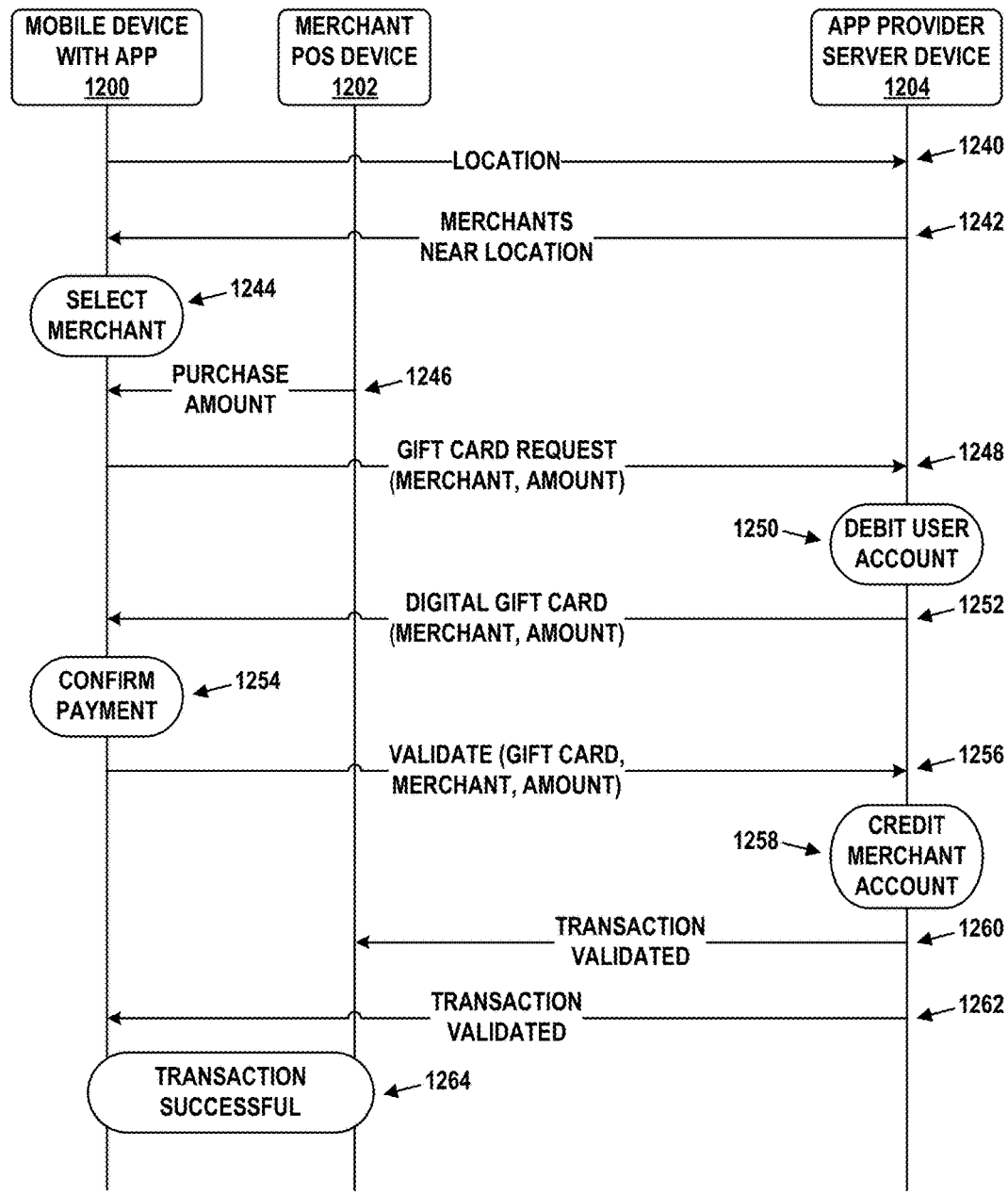
FIG. 12B is a message flow diagram, in accordance with example embodiments.

FIGS. 12A and 12B depict message flows according to example embodiments. The processes illustrated by these figures may be carried out by a mobile device 1200 that is executing the app, merchant POS device 1202, and app provider server device 1204. Mobile device 1200 and merchant POS device 1202 may be embodied by computing device 100, and app provider server device 1204 may be embodied by server cluster 200 and carry out the operations of app provider server device 1106.

At step 1210 of FIG. 12A, the app executing on mobile device 1200 may transmit a representation of its location to app provider server device 1204. A user of mobile device 1200 may have triggered this transmission by requesting a list of nearby merchants that participate in the app provider's UPC network.

At step 1212, app provider server device 1204 may transmit such a list to mobile device 1200. The app may display the list in order of increasing distance from mobile device 1200, and may provide buttons, selectors, or other types of widgets with which each merchant may be selected.

At step 1214, the user may select such a merchant. The user may further shop at the merchant's physical location (e.g., the merchant's store) and select one or more goods or services for purchase.

At step 1216, merchant POS device 1202 may provide the purchase amount of these selected items. This amount may be provided in a variety of ways. For instance, the amount may be displayed on merchant POS device 1202 so that the user can user the amount into the app. Alternatively, the amount may be provided wirelessly (e.g., using BLUETOOTH®) to the app.

At step 1218, the app may transmit a gift card request to app provider server device 1204. This request may include an indication of the merchant and the amount.

At step 1220, app provider server device 1204 may debit the user's account. This account may be identified, for instance, by the session information associated with communication between the app and app provider server device 1204. Depending on any discount applied to the transaction, the amount that the user's account is debited may be less than the amount requested. Further, app provider server device 1204 may generate or otherwise obtain a UPC for the requested amount. This UPC may be immediately exchanged for a digital gift card branded by the merchant for the same amount.

At step 1222, app provider server device 1204 may transmit a representation of the digital gift card to the app. The digital gift card may be displayed on the app, and this display may include a name of the merchant, logo of the merchant, the amount for which the card is issued (e.g., the requested amount), and/or a code. The code may be, for example, alphanumeric, a bar code, or may take some other form. The code may identify the gift card.

At step 1224, the user may cause the app to display at least the code, and hold the mobile device so that merchant POS device 1202 can scan or otherwise capture an image of the code. At step 1226, merchant POS device 1202 may transmit a representation of the scanned code and the amount to app provider server device 1204. Alternatively, the merchant may enter a representation of the code and the amount into a merchant-specific portal web site or a merchant-specific mobile application. In these cases, the code may be an alphanumeric code. Then, the merchant-specific portal web site or merchant-specific mobile application may provide the code and the amount to app provider server device 1204.

At step 1228, app provider server device 1204 may validate that the gift card can be debited by the amount. This may involve determining that the code identifies a valid gift card and that the identified gift card can be debited for the amount. Then, app provider server device 1204 debits the gift card (since the gift card is for the exact amount of the transaction, the gift card balance should be $0 afterward), and credits the merchant's account for this amount minus any transaction or processing fees. These fees may be credited to an account of the app provider.

At steps 1230 and 1232, app provider server device 1204 transmits respective indications that the transaction was validated and successful to merchant POS device 1202 and the app. At step 1234, reception of such a message may cause merchant POS device 1202 to display an indication that the transaction was successful (e.g., merchant POS device 1202 may display a message "paid in full"). Reception of such a message may also cause the app to display an indication that the transaction was successful (e.g., the app may display a message "payment approved"). At this point, the user's purchase of goods is complete, and all parties in the transaction have been compensated appropriately.

Steps 1240, 1242, 1244, 1246, 1248, 1250, and 1252 of FIG. 12B may be substantially similar to the respective steps 1210, 1212, 1214, 1216, 1218, 1220, and 1222 of FIG. 12A. At step 1254, the user confirms payment by way of the app. Instead of displaying a code for merchant POS device 1202 to scan, the user may indicate, by way of the app's user interface, that he or she would like to use the balance of the gift card to pay for the goods and services.

At step 1256, the app transmits a validation request to app provider server device 1204. The validation request may identify the gift card as well as the amount.

Steps 1258, 1260, 1262, and 1264 may be substantially similar to the respective steps 1228, 1230, 1232, and 1234 of FIG. 12A. Thus, at or after step 1264, the user's purchase of goods and/or services is complete, and all parties in the transaction have been compensated appropriately.

VII. EXAMPLE OPERATIONS

Figure 13:
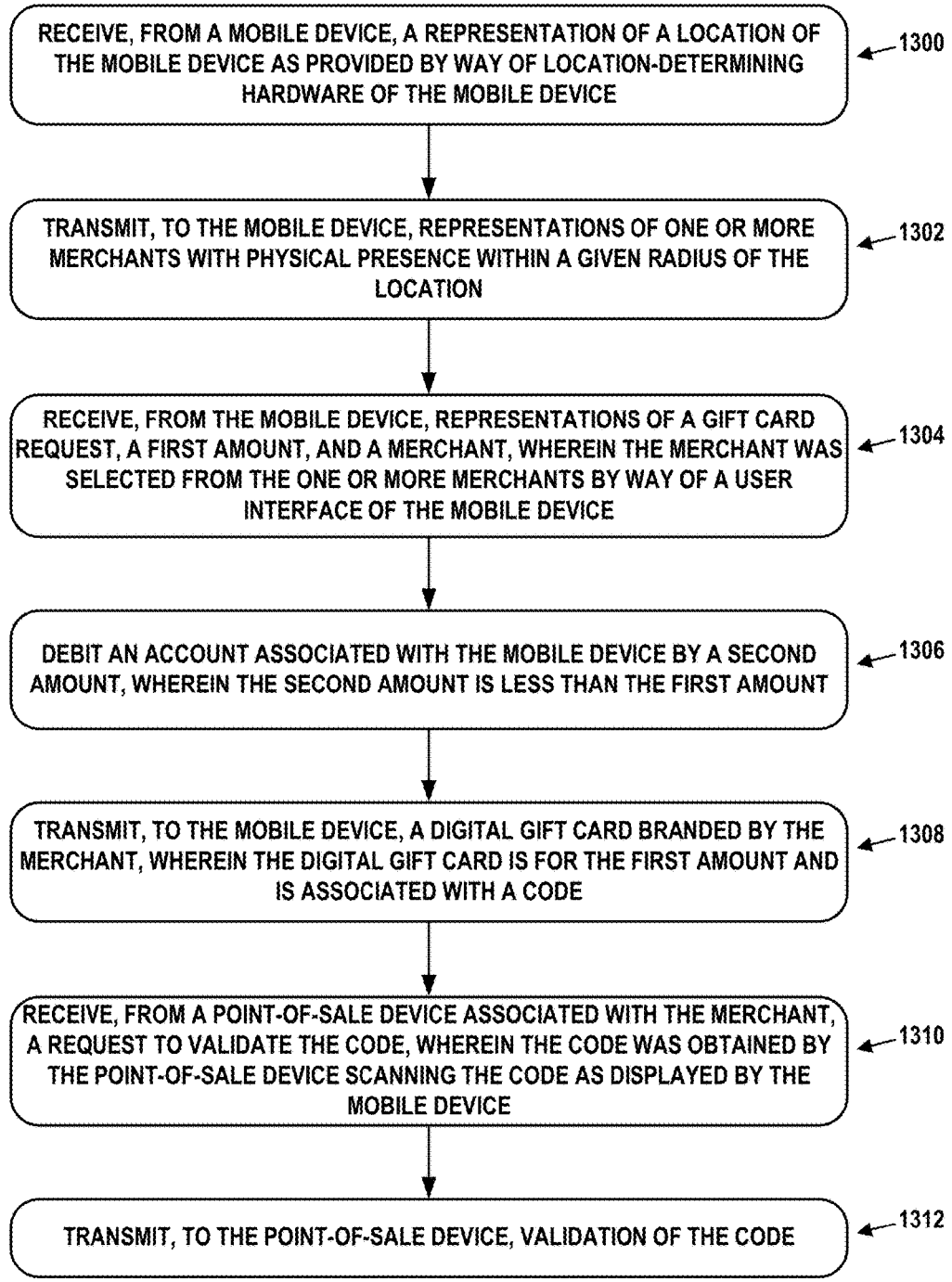
FIG. 13 is a flow chart, in accordance with example embodiments.
Figure 14:
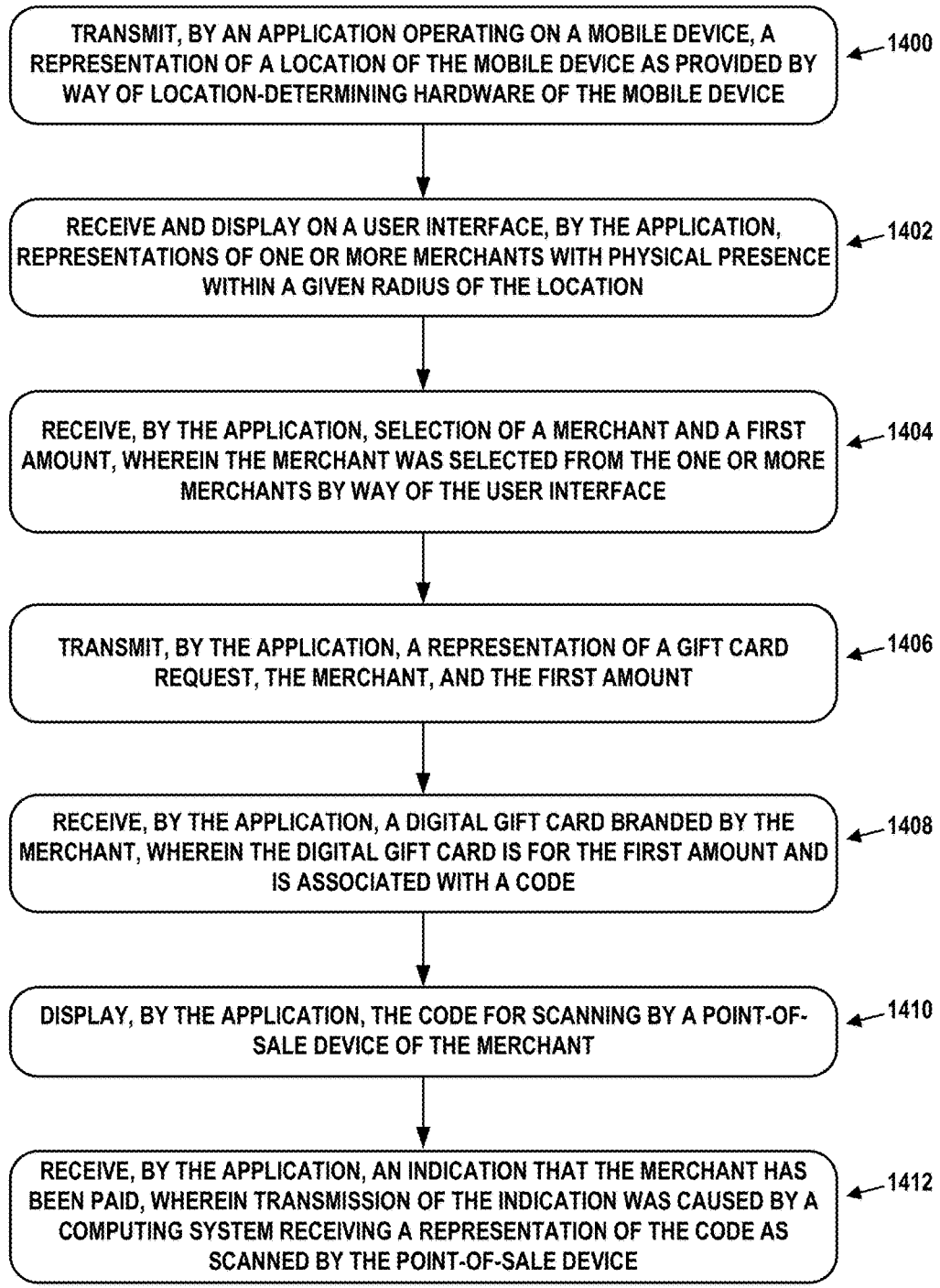
FIG. 14 is a flow chart, in accordance with example embodiments.
Figure 15:
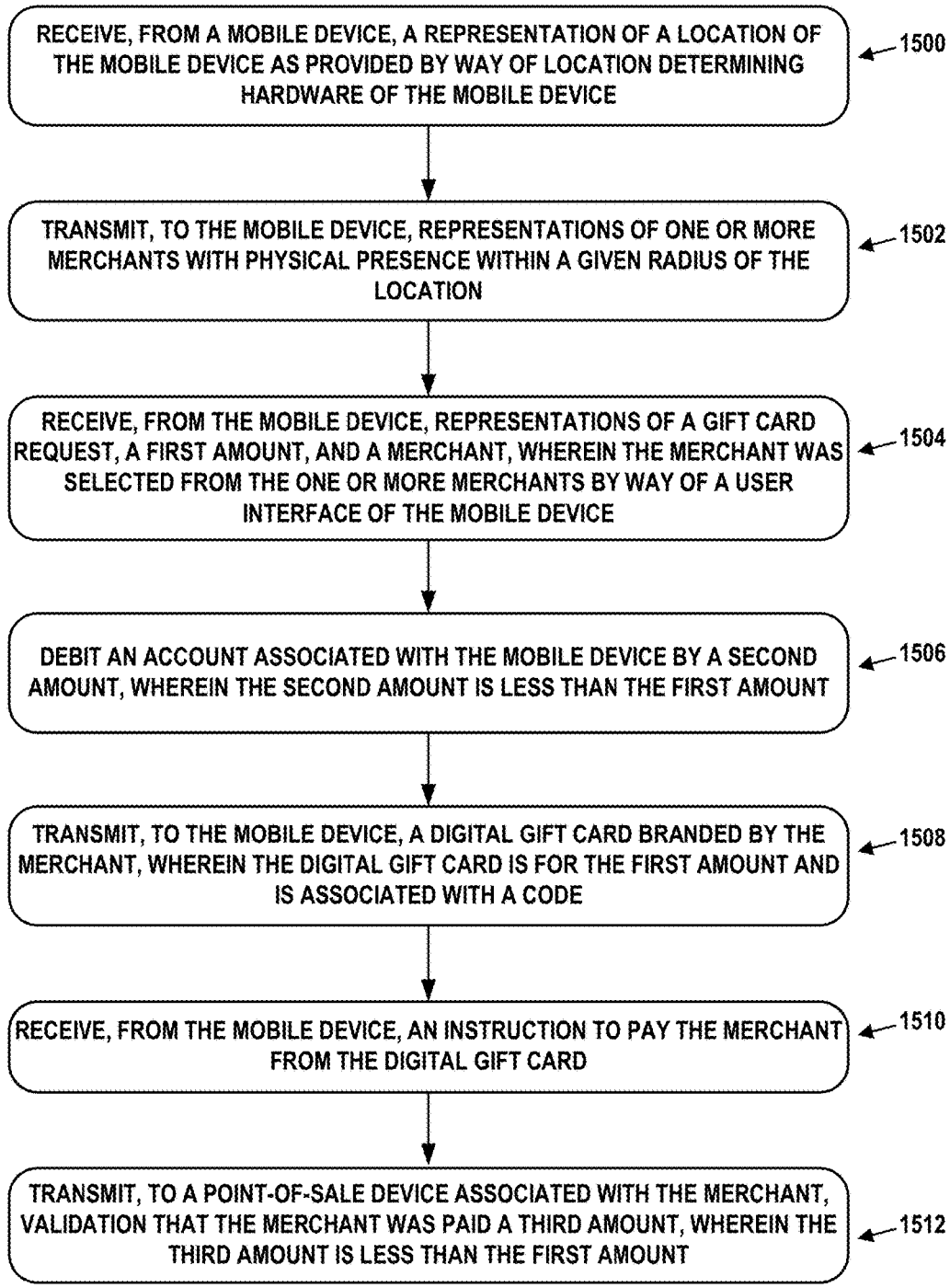
FIG. 15 is a flow chart, in accordance with example embodiments.

FIGS. 13-15 are flow charts illustrating example embodiments. The processes illustrated by FIG. 13-15 may be carried out by computing devices, such as computing device 100, and/or a cluster of computing devices, such as server cluster 200. However, the processes can be carried out by other types of devices or device subsystems. For example, the processes could be carried out by portable computers, such as laptops or tablet devices.

The embodiments of FIGS. 13-15 may be simplified by the removal of any one or more of the features shown therein. Further, these embodiments may be combined with features, aspects, and/or implementations of any of the previous figures or otherwise described herein. Particularly, FIGS. 14 and 15 may include any variations, embodiments, or features described in the context of FIG. 13.

A. Server-Side Processing with Using a Code

Block 1300 of FIG. 13 may involve receiving, by a computing system and from a mobile device, a representation of a location of the mobile device as provided by way of location-determining hardware (e.g., GPS, base station triangulation using a cellular or Wifi interface, and so on) of the mobile device. The computing system may be one or more app provider server devices.

Block 1302 may involve transmitting, by the computing system and to the mobile device, representations of one or more merchants with physical presence within a given radius of the location. The given radius may be anywhere from a few feet to several miles.

Block 1304 may involve receiving, by the computing system and from the mobile device, representations of a gift card request, a first amount, and a merchant. The merchant may have been selected from the one or more merchants by way of a user interface of the mobile device. The first amount may be a value of goods or services purchased from the merchant by way of the mobile device, and the second amount may be the first amount minus a discount applied to the value of the goods or services purchased.

Block 1306 may involve debiting, by the computing system, an account associated with the mobile device by a second amount. The second amount may be less than the first amount.

Block 1308 may involve transmitting, by the computing system and to the mobile device, a digital gift card branded by the merchant. The digital gift card may be for the first amount and may be associated with a code.

Block 1310 may involve receiving, by the computing system and from a point-of-sale device associated with the merchant, a request to validate the code. The code may have been obtained by the point-of-sale device scanning the code as displayed by the mobile device. Alternatively, the code may be obtained in other ways, such as wireless communication (e.g., Wifi, BLUETOOTH®, or NFC) between the mobile device and the point-of-sale device. The code as displayed by the mobile device may be a barcode that identifies the digital gift card.

Block 1312 may involve transmitting, by the computing system and to the point-of-sale device, validation of the code.

In some embodiments, the processing may further involve providing, by the computing system, a UPC for a third amount to an account associated with the merchant. The third amount may be less than the first amount. Particularly, the third amount may be determined by subtracting a marketing fee, a transaction fee, or both, to the first amount. The UPC may be redeemable by the merchant for face value within a network of merchants, and redeemable by the merchant for less than the face value in cash.

In some embodiments, the processing may further involve providing, by the computing system, cash or a direct deposit for a third amount to an account associated with the merchant. The third amount may be less than the first amount.

In some embodiments, the processing may further involve, (i) before transmitting the digital gift card branded by the merchant, allocating, by the computing system, a UPC for the first amount to the mobile device, and (ii) exchanging the universal prepaid card with the digital gift card.

In some embodiments, the processing may further involve transmitting, by the computing system and to the mobile device, a second validation of the code. The validation of the code and the second validation of the code both indicate that a purchase of goods or services has been successful.

B. Client-Side Processing with Using a Code

Block 1400 of FIG. 14 may involve transmitting, by an application operating on a mobile device and to a computing system, a representation of a location of the mobile device as provided by way of location-determining hardware (e.g., GPS, base station triangulation using a cellular or Wifi interface, and so on) of the mobile device. The computing system may be one or more app provider server devices.

Block 1402 may involve receiving and displaying on a user interface, by the application, representations of one or more merchants with physical presence within a given radius of the location.

Block 1404 may involve receiving, by the application, selection of a merchant and a first amount. The merchant may have been selected from the one or more merchants by way of the user interface. A user of the mobile device may be a representative of another merchant. Reception of the representation of the gift card request, the merchant, and the first amount may cause an account associated with the mobile device to be debited by a second amount. The second amount may be less than the first amount.

Block 1406 may involve transmitting, by the application and to the computing system, a representation of a gift card request, the merchant, and the first amount.

Block 1408 may involve receiving, by the application and from the computing system, a digital gift card branded by the merchant. The digital gift card may be for the first amount and may be associated with a code.

Block 1410 may involve displaying, by the application, the code for scanning by a point-of-sale device of the merchant. The code as displayed by the mobile device may be a barcode that identifies the digital gift card.

Block 1412 may involve receiving, by the application and from the computing system, an indication that the merchant has been paid. Transmission of the indication may have been caused by the computing system receiving a representation of the code as scanned by the point-of-sale device. A third amount may be credited to an account associated with the merchant in the form of a UPC. The third amount may be less than the first amount. The UPC may be redeemable by the merchant for face value within a network of merchants, and the UPC may be redeemable by the merchant for less than the face value in cash.

C. Server-Side Processing with Server Validation

Block 1500 of FIG. 15 may involve receiving, by a computing system and from a mobile device, a representation of a location of the mobile device as provided by way of location-determining hardware (e.g., GPS, base station triangulation using a cellular or Wifi interface, and so on) of the mobile device. The computing system may be one or more app provider server devices.

Block 1502 may involve transmitting, by the computing system and to the mobile device, representations of one or more merchants with physical presence within a given radius of the location;

Block 1504 may involve receiving, by the computing system and from the mobile device, representations of a gift card request, a first amount, and a merchant. The merchant may have been selected from the one or more merchants by way of a user interface of the mobile device. The first amount may be a value of goods or services purchased from the merchant by way of the mobile device, and the second amount may be the first amount minus a discount applied to the value of the goods or services purchased.

Block 1506 may involve debiting, by the computing system, an account associated with the mobile device by a second amount. The second amount may be less than the first amount.

Block 1508 may involve transmitting, by the computing system and to the mobile device, a digital gift card branded by the merchant. The digital gift card may be for the first amount and may be associated with a code.

Block 1510 may involve receiving, by the computing system and from the mobile device, an instruction to pay the merchant from the digital gift card.

Block 1512 may involve transmitting, by the computing system and to a point-of-sale device associated with the merchant, validation that the merchant was paid a third amount. The third amount may be less than the first amount. Particularly, the third amount may be determined by subtracting a marketing fee, a transaction fee, or both, to the first amount.

In some embodiments, the processing may further involve, (i) before transmitting the digital gift card branded by the merchant, allocating, by the computing system, a universal prepaid card for the first amount to the mobile device, and (ii) exchanging the universal prepaid card with the digital gift card.

In some embodiments, the processing may further involve transmitting, by the computing system and to the mobile device, a second validation. The validation and the second validation may both indicate that a purchase of goods or services for the first amount has been successful.

VIII. EXAMPLE ADVANTAGES

The present disclosure describes embodiments that provide a number of advantages over conventional payment systems. As noted above, previous systems provided little or no incentive for merchant adoption. The embodiments herein incentivize merchant adoption by (i) providing merchants with the capability to select an appropriate discount for their goods and services, (ii) generating consumer interest in the merchant's goods and services by way of location-based services built into the app, and (iii) outsourcing marketing efforts that the merchant would otherwise undertake.

Further, the embodiments herein do not require the consumer or the merchants to upgrade to the latest mobile device or POS technology. The app will work on most existing smart phones, and the merchant POS device does not need to support NFC. Though NFC is not required, it may be supported when present.

Conventional payment systems do not have the ability to provide consumers with an instant discount on each transaction. For example, today's merchant loyalty programs require that consumers make a number of undiscounted purchases before "earning" a discount, while credit card purchasers need to undertake a number of undiscounted transactions before receiving a cash, gift card, or merchandise-related reward.

Also, the embodiments herein are not limited to a particular mobile device type or mobile operating system. Further, these embodiments support discounted transactions with any merchant in the app provider's network. Current systems are limited to particular device vendors, operating systems, and/or merchants.

These advantages are just examples of the benefits that the payment systems herein and their underlying technologies provide. Other advantages may be readily apparent from the disclosure herein.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
    receiving, by a computing system and from a mobile device, a representation of a location of the mobile device as provided by way of global positioning system (GPS) hardware of the mobile device;
    transmitting, by the computing system and to the mobile device, representations of one or more merchants with physical presence within a given radius of the location;
    receiving, by the computing system and from the mobile device, representations of a gift card request, a first amount, and a merchant, wherein the merchant was selected from the one or more merchants by way of a user interface of the mobile device;
    debiting, by the computing system, an account associated with the mobile device by a second amount, wherein the second amount is less than the first amount;
    transmitting, by the computing system and to the mobile device, a digital gift card branded by the merchant, wherein the digital gift card is for the first amount and is associated with a code;
    receiving, by the computing system and from a point-of-sale device associated with the merchant, a request to validate the code, wherein the code was obtained by the point-of-sale device scanning the code as displayed by the mobile device;
    transmitting, by the computing system and to the point-of-sale device, validation of the code; and
    providing, by the computing system, a universal prepaid card for a third amount to an account associated with the merchant, wherein the third amount is less than the first amount.

2. The method of claim 1, wherein the third amount is determined by subtracting a marketing fee, a transaction fee, or both, from the first amount.

3. The method of claim 1, wherein the universal prepaid card is redeemable by the merchant for face value within a network of merchants, and wherein the universal prepaid card is redeemable by the merchant for less than the face value in cash.

4. The method of claim 1, further comprising:
    before transmitting the digital gift card branded by the merchant, allocating, by the computing system, a second universal prepaid card for the first amount to the mobile device; and
    exchanging the second universal prepaid card with the digital gift card.

5. The method of claim 1, wherein the first amount is a value of goods or services purchased from the merchant by way of the mobile device, and wherein the second amount is the first amount minus a discount applied to the value of the goods or services purchased.

6. The method of claim 1, wherein the code as displayed by the mobile device is a barcode that identifies the digital gift card.

7. The method of claim 1, further comprising:
    transmitting, by the computing system and to the mobile device, a second validation of the code, wherein the validation of the code and the second validation of the code both indicate that a purchase of goods or services for the first amount has been successful.

8. A method comprising:
    transmitting, by an application operating on a mobile device and to a computing system, a representation of a location of the mobile device as provided by way of global positioning system (GPS) hardware of the mobile device;
    receiving and displaying on a user interface, by the application, representations of one or more merchants with physical presence within a given radius of the location;
    receiving, by the application, selection of a merchant and a first amount, wherein the merchant was selected from the one or more merchants by way of the user interface;
    transmitting, by the application and to the computing system, a representation of a gift card request, the merchant, and the first amount;
    receiving, by the application and from the computing system, a digital gift card branded by the merchant, wherein the digital gift card is for the first amount and is associated with a code;
    displaying, by the application, the code for scanning by a point-of-sale device of the merchant; and
    receiving, by the application and from the computing system, an indication that the merchant has been paid, wherein transmission of the indication was caused by the computing system receiving a representation of the code as scanned by the point-of-sale device, wherein a second amount is credited to an account associated with the merchant as a universal prepaid card, and wherein the second amount is less than the first amount.

9. The method of claim 8, wherein a user of the mobile device is a representative of another merchant.

10. The method of claim 8, wherein reception of the representation of the gift card request, the merchant, and the first amount causes an account associated with the mobile device to be debited by a third amount, and wherein the third amount is less than the first amount.

11. The method of claim 8, wherein the universal prepaid card is redeemable by the merchant for face value within a network of merchants, and wherein the universal prepaid card is redeemable by the merchant for less than the face value in cash.

12. The method of claim 8, wherein the code as displayed by the mobile device is a barcode that identifies the digital gift card.

13. The method of claim 10, wherein the third amount is determined by subtracting a marketing fee, a transaction fee, or both, from the first amount.

14. A method comprising:
    receiving, by a computing system and from a mobile device, a representation of a location of the mobile device as provided by way of global positioning system (GPS) hardware of the mobile device;

transmitting, by the computing system and to the mobile device, representations of one or more merchants with physical presence within a given radius of the location;

receiving, by the computing system and from the mobile device, representations of a gift card request, a first amount, and a merchant, wherein the merchant was selected from the one or more merchants by way of a user interface of the mobile device;

debiting, by the computing system, an account associated with the mobile device by a second amount, wherein the second amount is less than the first amount;

allocating, by the computing system, a universal prepaid card for the first amount to the mobile device;

exchanging, by the computing system, the universal prepaid card with a digital gift card branded by the merchant;

transmitting, by the computing system and to the mobile device, the digital gift card, wherein the digital gift card is for the first amount and is associated with a code;

receiving, by the computing system and from the mobile device, an instruction to pay the merchant from the digital gift card; and transmitting, by the computing system and to a point-of-sale device associated with the merchant, validation that the merchant was paid a third amount, wherein the third amount is less than the first amount.

15. The method of claim 14, wherein the third amount is determined by subtracting a marketing fee, a transaction fee, or both, to the first amount.

16. The method of claim 14, wherein the first amount is a value of goods or services purchased from the merchant by way of the mobile device, and wherein the second amount is the first amount minus a discount applied to the value of the goods or services purchased.

17. The method of claim 14, further comprising:

transmitting, by the computing system and to the mobile device, a second validation, wherein the validation and the second validation both indicate that a purchase of goods or services for the first amount has been successful.

* * * * *